United States Patent
Yoshii et al.

(10) Patent No.: US 8,341,348 B2
(45) Date of Patent: Dec. 25, 2012

(54) COMPUTER SYSTEM AND LOAD EQUALIZATION CONTROL METHOD FOR THE SAME WHERE CACHE MEMORY IS ALLOCATED TO CONTROLLERS

(75) Inventors: Yoshihiro Yoshii, Yokohama (JP);
Shintaro Kudo, Yokohama (JP);
Kazuyoshi Serizawa, Tama (JP);
Masayuki Yamamoto, Sagamihara (JP);
Sadahiro Sugimoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 360 days.

(21) Appl. No.: 12/665,080

(22) PCT Filed: Nov. 19, 2009

(86) PCT No.: PCT/JP2009/006229
§ 371 (c)(1),
(2), (4) Date: Dec. 17, 2009

(87) PCT Pub. No.: WO2011/061801
PCT Pub. Date: May 26, 2011

(65) Prior Publication Data
US 2011/0191547 A1 Aug. 4, 2011

(51) Int. Cl.
*G06F 13/00* (2006.01)

(52) U.S. Cl. ................. 711/113; 711/E12.014
(58) Field of Classification Search ........................ None
See application file for complete search history.

(56) References Cited

U.S. PATENT DOCUMENTS

2007/0245085 A1 10/2007 Hoshino et al.
2008/0263190 A1* 10/2008 Serizawa et al. ............. 709/223

FOREIGN PATENT DOCUMENTS

EP        1 986 090 A2    10/2008
JP        2008-269424 A   11/2008

* cited by examiner

*Primary Examiner* — Edward Dudek, Jr.
*Assistant Examiner* — Sean D Rossiter
(74) *Attorney, Agent, or Firm* — Mattingly & Malur, PC

(57) ABSTRACT

A computer system having a plurality of controllers for data input/output control is provided, wherein even if a control authority of a processor is transferred to another processor and the computer system migrates control information necessary for a controller to execute data input/output processing, from a shared memory to a local memory for the relevant controller, the computer system prevents the occurrence of unbalanced allocation of a control function necessary for data input/output control between the plurality of controllers; and a load equalization method for such a computer system is also provided.

11 Claims, 31 Drawing Sheets

EXAMPLE OF SLOT ATTRIBUTE MANAGEMENT STRUCTURE

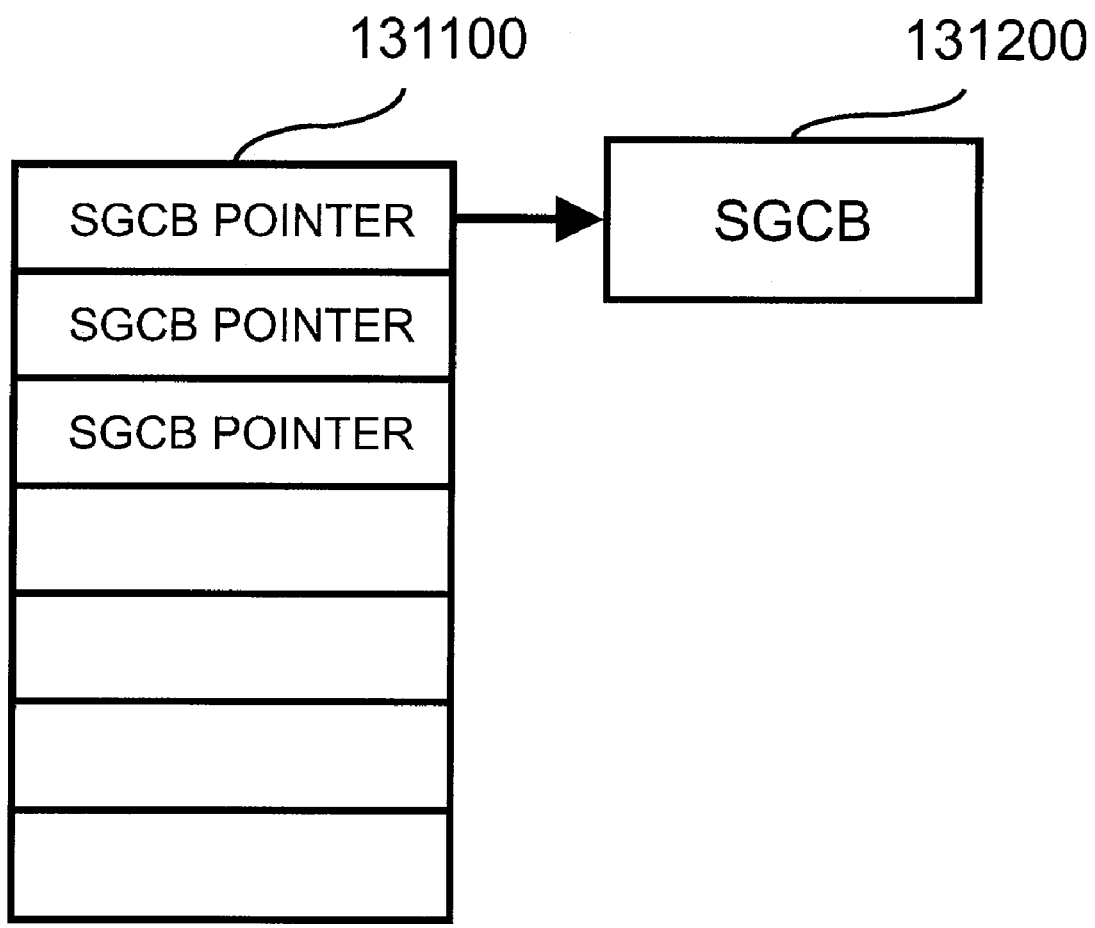

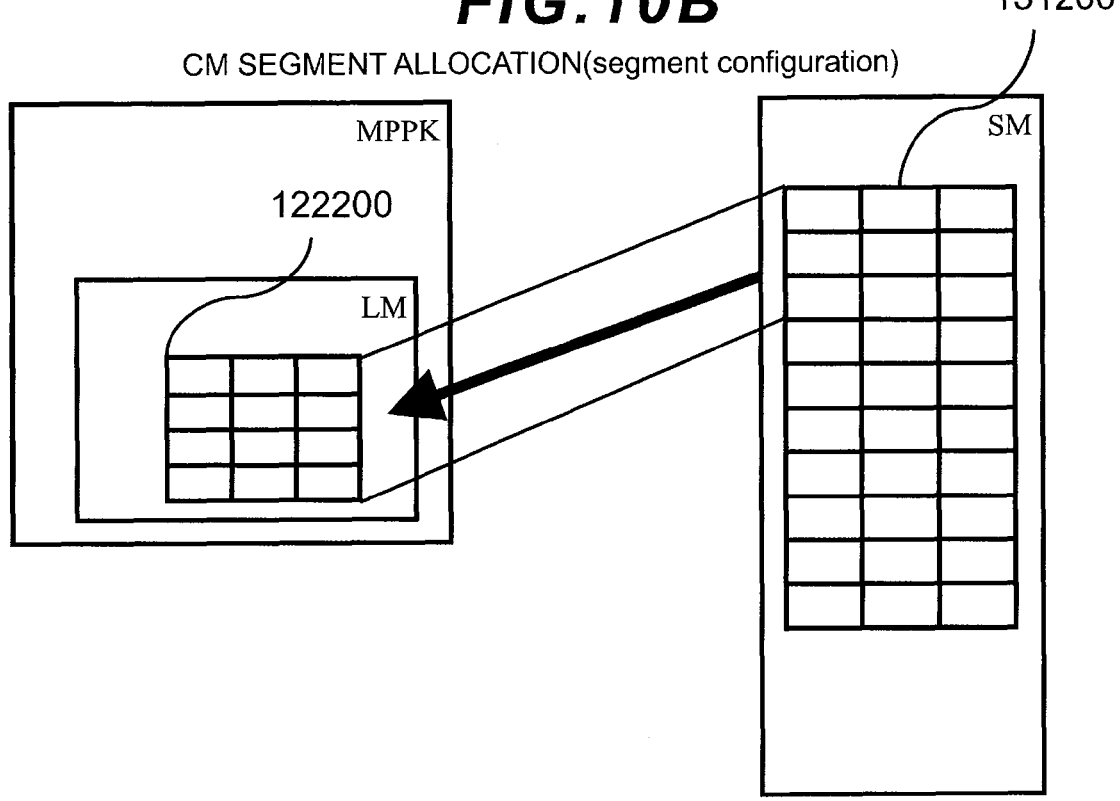

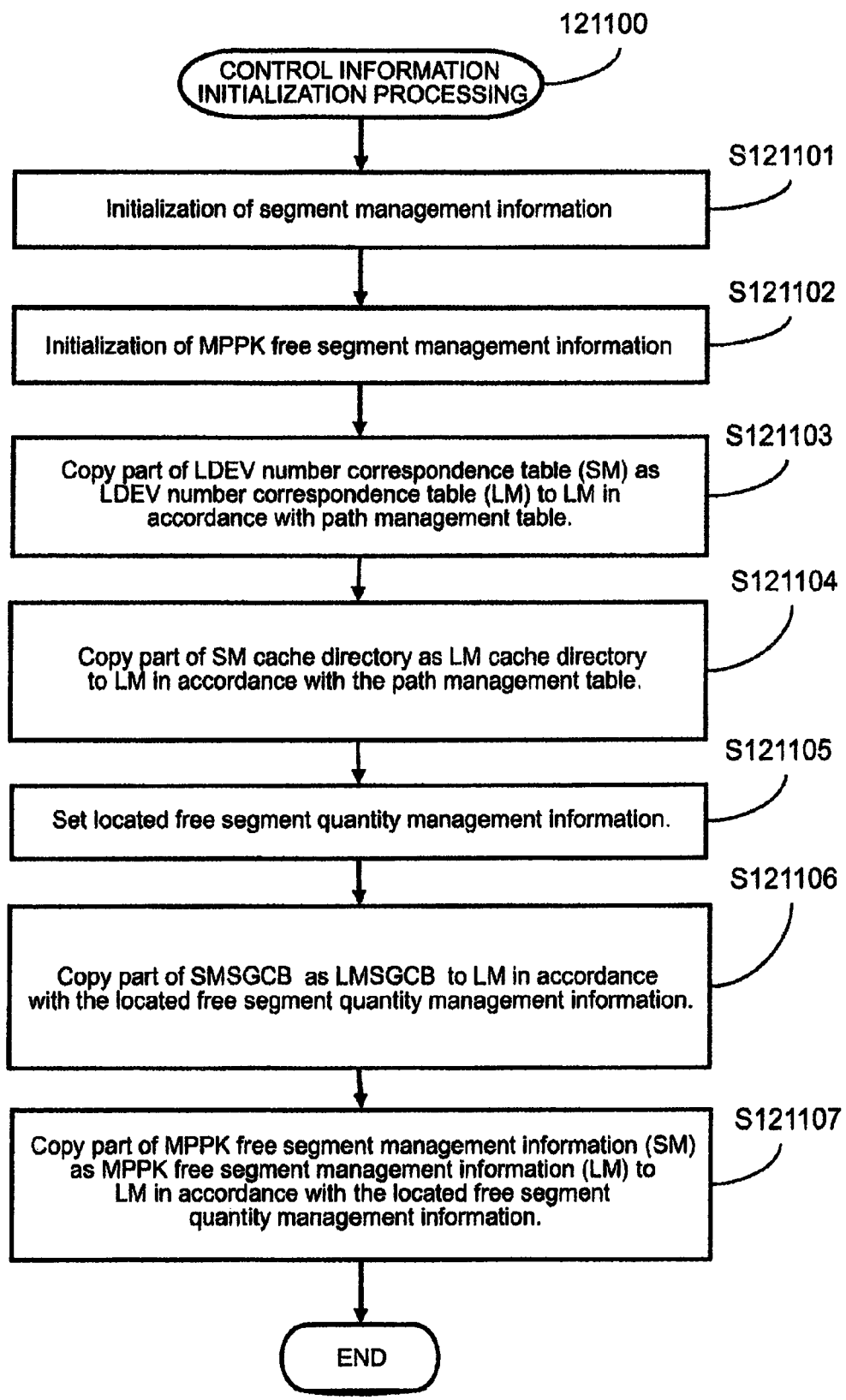

SEGMENT PLACEMENT CHECK SCREEN ACCORDING TO FIRST EMBODIMENT

Example of Flow of (Read) Processing Executed When Host Command Is Received

Example of Flow of (Write) Processing Executed When Host Command Is Received

MANUAL SEGMENT RELOCATION SCREEN

FIG.27A

PATH MANAGEMENT TABLE

151000

| LUN | MPPK# |
|---|---|
| xxxxxx | 0 |
| yyyyyy | 0 |
| zzzzzz | 1 |
| ⋮ | ⋮ |

LDEV NUMBER CORRESPONDENCE TABLES

COMPUTER SYSTEM AND LOAD EQUALIZATION CONTROL METHOD FOR THE SAME WHERE CACHE MEMORY IS ALLOCATED TO CONTROLLERS

TECHNICAL FIELD

The present invention relates to a computer system for providing a user apparatus with a data storage service, and also to a load control method for such a computer system.

BACKGROUND ART

This type of computer system includes a host system such as a host computer on a user's side and a storage system for realizing data storage processing on the host system. The storage system includes storage units for storing data and a storage subsystem for processing data input/output requests between storage devices and the host computer.

The storage subsystem manages logical storage areas as targets of input/output from the host computer, and a controller in the storage subsystem performs processing for writing data to logical volumes and processing for reading data from logical volumes.

Some types of storage subsystems have a plurality of controllers. Such a storage subsystem makes the plurality of controllers share the processing for inputting/outputting data to/from a plurality of logical volumes in order to equalize load caused by the data processing among the plurality of controllers.

Specifically speaking, an administrator of the storage subsystem sets allocation of the controllers to take charge in processing for inputting/outputting data to/from logical volumes to a control memory for the storage subsystem before starting the operation of a data storage service.

If a load on the plurality of controllers becomes unbalanced after starting the operation of the data storage service, the storage subsystem can transfer a control and processing authority of a controller, on which the load is concentrated, over logical volumes belonging to that controller to another controller (Japanese Patent Application Laid-Open (Kokai) Publication No. 2008-269424).

CITATION LIST

Patent Literature

[PTL (Patent Literature) 1]
Japanese Patent Application Laid-Open (Kokai) Publication No. 2008-269424

SUMMARY OF INVENTION

Technical Problem

The storage system reallocates control information about the transfer source controller, such as LDEV configuration information and directory information about segments in a cache memory, from the transfer source controller to the transfer destination controller so that the transfer destination controller can continue controlling input/output to/from logical volumes which it has taken over from the transfer source controller.

If the storage subsystem migrates control information necessary for a controller to execute the data input/output processing, from a shared memory to a local memory for the transfer destination controller so that the controller can promptly access the control information, other controllers cannot refer to the control information belonging to the transfer destination controller. As a result, there is a problem of the occurrence of unbalance of the control information among the plurality of controllers.

As a result, even if the control authority of the controller, on which load is concentrated, over logical volumes is transferred to another controller in an attempt to equalize the load among the plurality of controllers as disclosed in Japanese Patent Application Laid-Open (Kokai) Publication No. 2008-269424, there is a possibility that this load equalization processing may result in, for example, delay in processing executed by the controller, whose allocated segments in the cache memory have been reduced, in response to access from the host computer.

Therefore, the conventional load distribution technique has a problem of incapability of sufficiently achieving input/output processing performance in the entire storage system.

It is an object of the present invention to provide: a computer system having a plurality of controllers for data input/output control wherein even if a control authority of a processor is transferred to another processor and the processor migrates the control information necessary for a controller to execute data input/output processing, from a shared memory to a local memory for the relevant controller to which the control authority has been transferred, the computer system prevents the occurrence of unbalanced allocation of a control function(s) necessary for data input/output control between the plurality of controllers; and a load equalization method for such a computer system.

Solution to Problem

In order to achieve the above-described object, a computer system having a plurality of controllers for data input/output control according to this invention is characterized in that even if a control authority of a controller is transferred to another controller and control information necessary for a controller to execute data input/output processing is migrated from a shared memory to a local memory for the relevant controller from which the control authority has been transferred, a control function necessary for data input/output control is released from the controller and the released control function is allocated to another controller in order to prevent the occurrence of unbalanced allocation of the control function necessary for data input/output control between the plurality of controllers.

Advantageous Effects of Invention

According to this invention, it is possible to provide: a computer system having a plurality of controllers for data input/output control wherein even if a control authority of a processor is transferred to another processor and the computer system migrates control information necessary for a controller to execute data input/output processing, from a shared memory to a local memory for the relevant controller to which the control authority has been transferred, the computer system prevents the occurrence of unbalanced allocation of the control function necessary for data input/output control between the plurality of controllers; and a load equalization method for such a computer system.

BRIEF DESCRIPTION OF DRAWINGS

FIG. 10A shows a block diagram showing "CM segment allocation".

FIG. 10B shows a block diagram for explaining "segment placement".

FIG. 11 is a flowchart illustrating processing for initial placement of free segments in a storage subsystem.

FIG. 27A is a block diagram showing the configuration of a path management table.

DESCRIPTION OF EMBODIMENTS

Next, embodiments of the present invention will be described with reference to the attached drawings. Incidentally, the embodiments described below are not intended to limit the invention described in the scope of claims and can be modified by those skilled in the art as they think proper.

Figure 1:
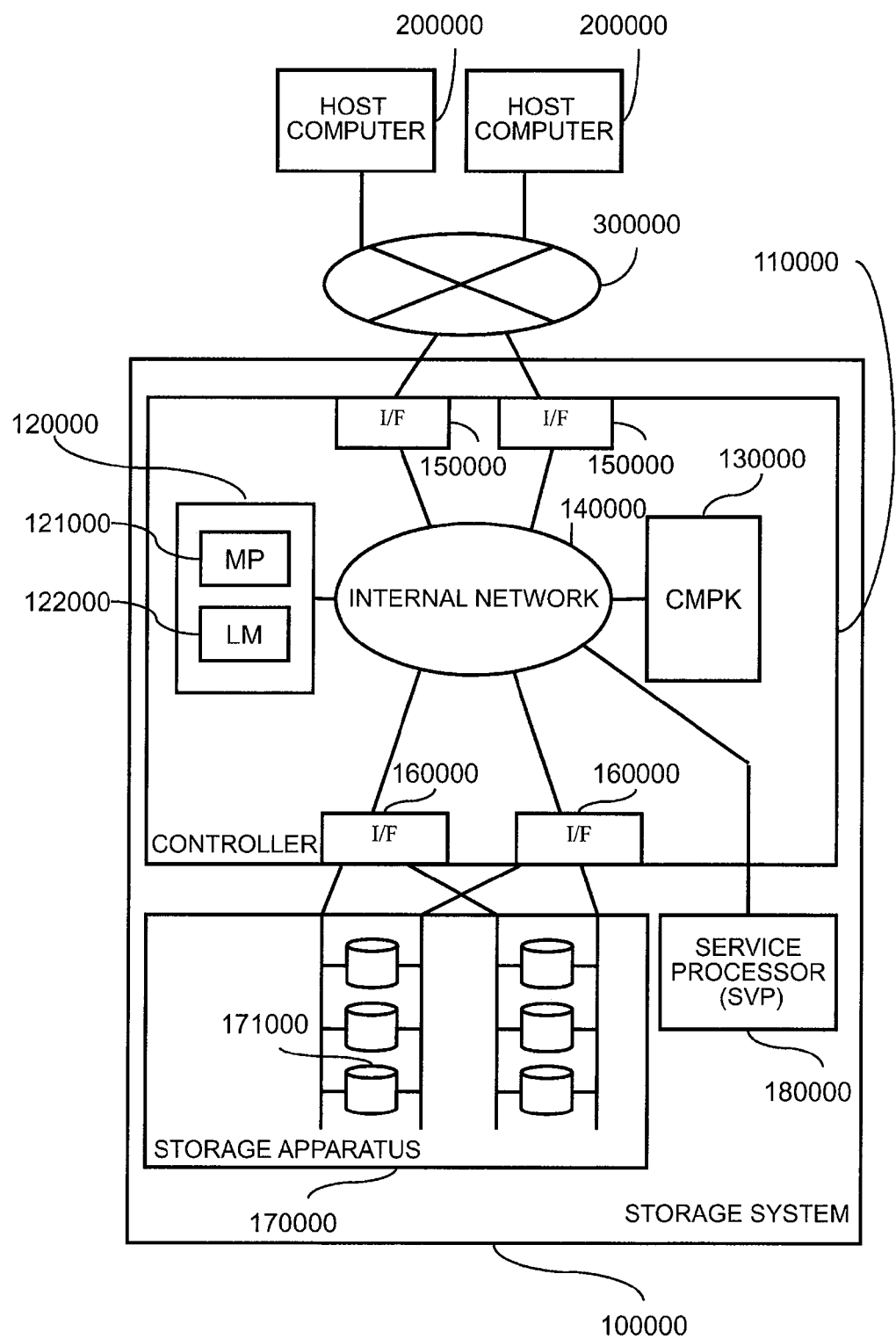
FIG. 1 is a hardware block diagram for explaining a computer system according to an embodiment of the present invention.

FIG. 1 is a block diagram showing an example of the configuration of a storage control system according to this invention. Reference numeral "100000" represents a storage system for providing host computers 200000 with a data storage service.

The storage system includes a storage subsystem 110000 as a controller means for data storage processing, a storage apparatus as a storage means 170000, and a service processor (SVP) 180000.

Reference numeral "120000" in the storage subsystem 110000 represents a microprocessor package (MPPK) as a control unit including a microprocessor. The MPPK includes one or more microprocessors (MP) 121000 and one or more local memories (LM) 122000. The LM has control information necessary for the MP.

Reference numeral "130000" represents a cache memory package (hereinafter abbreviated as "CMPK") serving as a storage area for the control information and a temporary storage area for user data; reference numeral "140000" represents an internal network; reference numeral "150000" represents one or more host I/Fs (interfaces); reference numeral "160000" represents one or more disk I/Fs; and reference numeral "170000" represents a storage apparatus 170000 having a plurality of storage devices 171000.

In the storage control system, the storage system 100000 and the host computers 200000 are connected via an external network 300000. The storage system 100000 is connected via the external network 300000 to one or more host computers 200000 that read/write data.

The external network may be, for example, a SAN (Storage Area Network), a LAN (Local Area Network), the Internet, private lines, or public lines as long as it is a network capable of data communication.

Examples of a protocol used in the network may be Fibre Channel Protocol or TCP/IP Protocol; and any protocol may be used as long as it enables data exchange between the host computer 200000 and the storage system 100000.

The host computer 200000 sends an I/O (Input-Output) request to the storage system 100000 in order to write/read data to/from the storage system 100000. The I/O request is, for example, an SCSI (Small Computer System Interface) command and includes, for example, information for indicating distinction between read and write, an SCSI port number indicating an access target device, an LUN (Logical Unit Number), and an LBA (Logical Block Address) indicating an access target area.

The host I/F 150000 is connected to the external network 300000. The host I/F 150000 is, for example, an FC port. The host I/F 150000 has a data transfer processor (not shown in the drawing). The data transfer processor transfers data from the CMPK 130000 to the host computer 200000.

Figure 26:
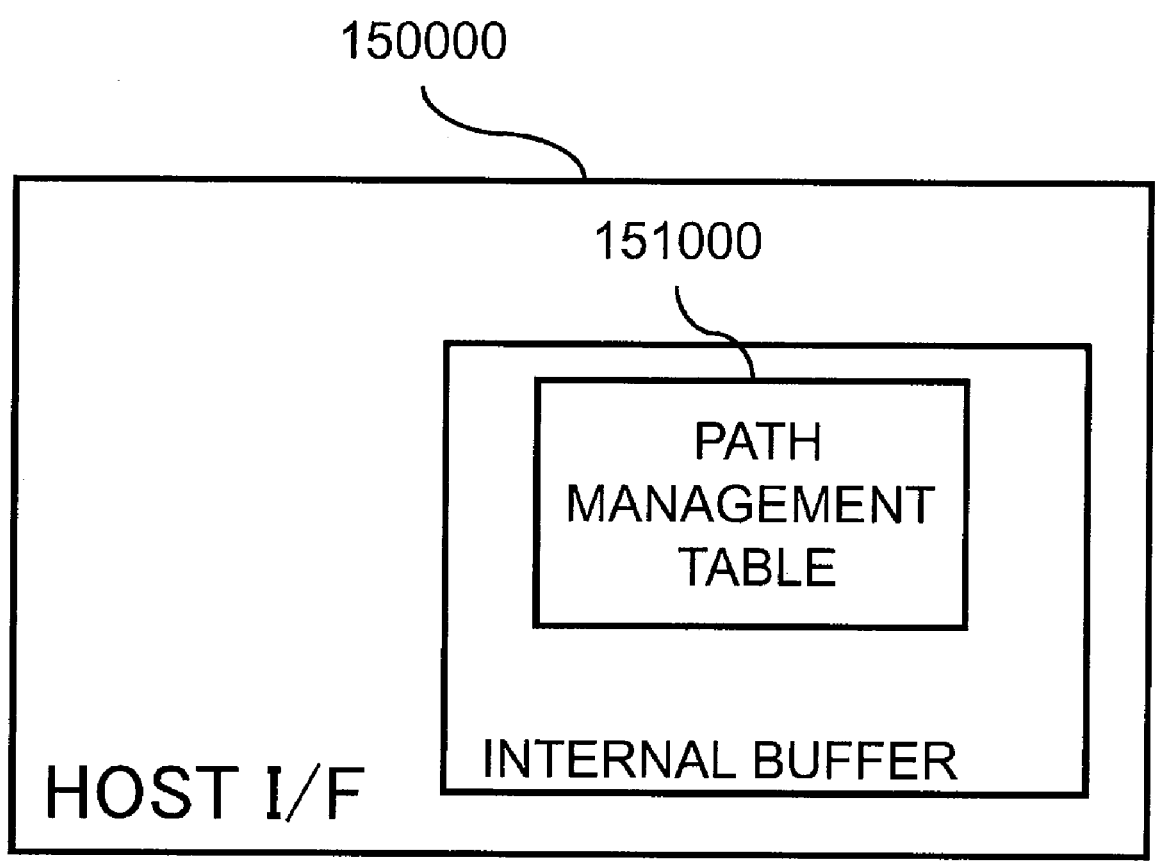
FIG. 26 is a block diagram showing an example of the logical configuration of a host I/F.

The host I/F 150000 has a host I/F buffer memory as shown in FIG. 26 in order to retain path management information 151000 for managing information about the correspondence relationship between MPPKs 120000 and LDEVs.

The disk I/F 160000 is connected to a plurality of storage devices 171000 in the storage apparatus 170000. The disk I/F 160000 is, for example, an FC (Fibre Channel) port. The disk I/F 160000 has a data transfer processor (not shown in the drawing) and the data transfer processor controls data transfer between the storage devices 171000 and the CMPK 130000.

All the storage devices 171000 in the storage apparatus 170000 may be of the same kind or different kinds. Possible examples of the storage devices 171000 are HDDs (Hard Disk Drives), SSDs (Solid State Drives), or tape storage devices (such as magnetic tape drives).

The storage subsystem 110000 can form one or more logical volumes from storage spaces of the plurality of storage devices 171000 and provides the host computer 200000 with these logical volumes as LDEVs (Logical Devices).

Figure 27B:
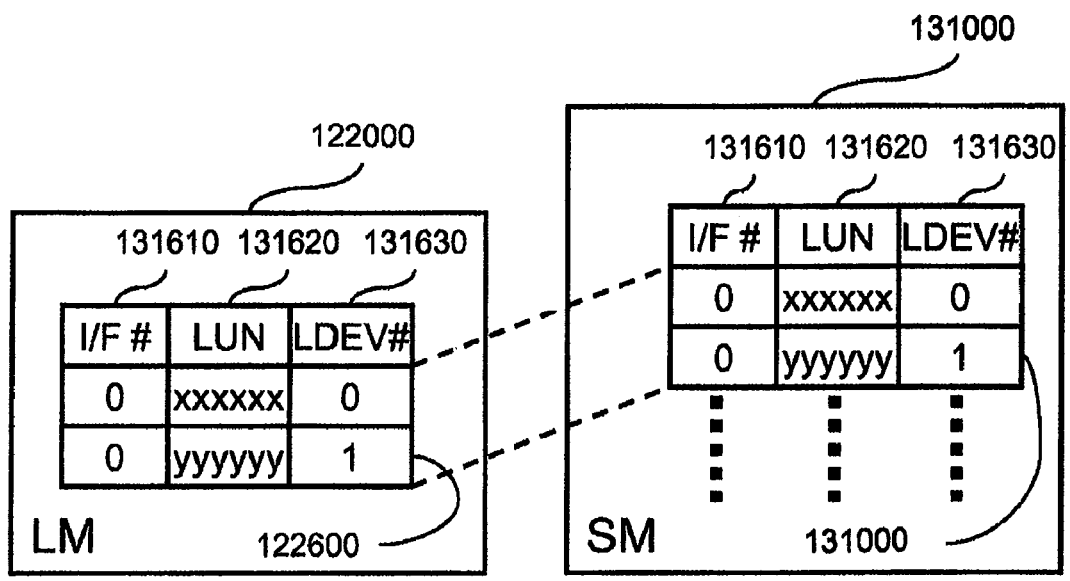
FIG. 27B is a block diagram showing the configuration of an LDEV number correspondence table.

For example, the storage subsystem 110000 constitutes a RAID (Redundant Array of Independent Disks) group from two or more storage devices 171000 from among the plurality of storage devices 171000 and sets LDEVs in a storage space in that RAID group. The LUN to be recognized by the host computer is set to each of the plurality of LDEVs according to an LDEV number correspondence table 131600 (FIG. 27B described later).

Figure 2:
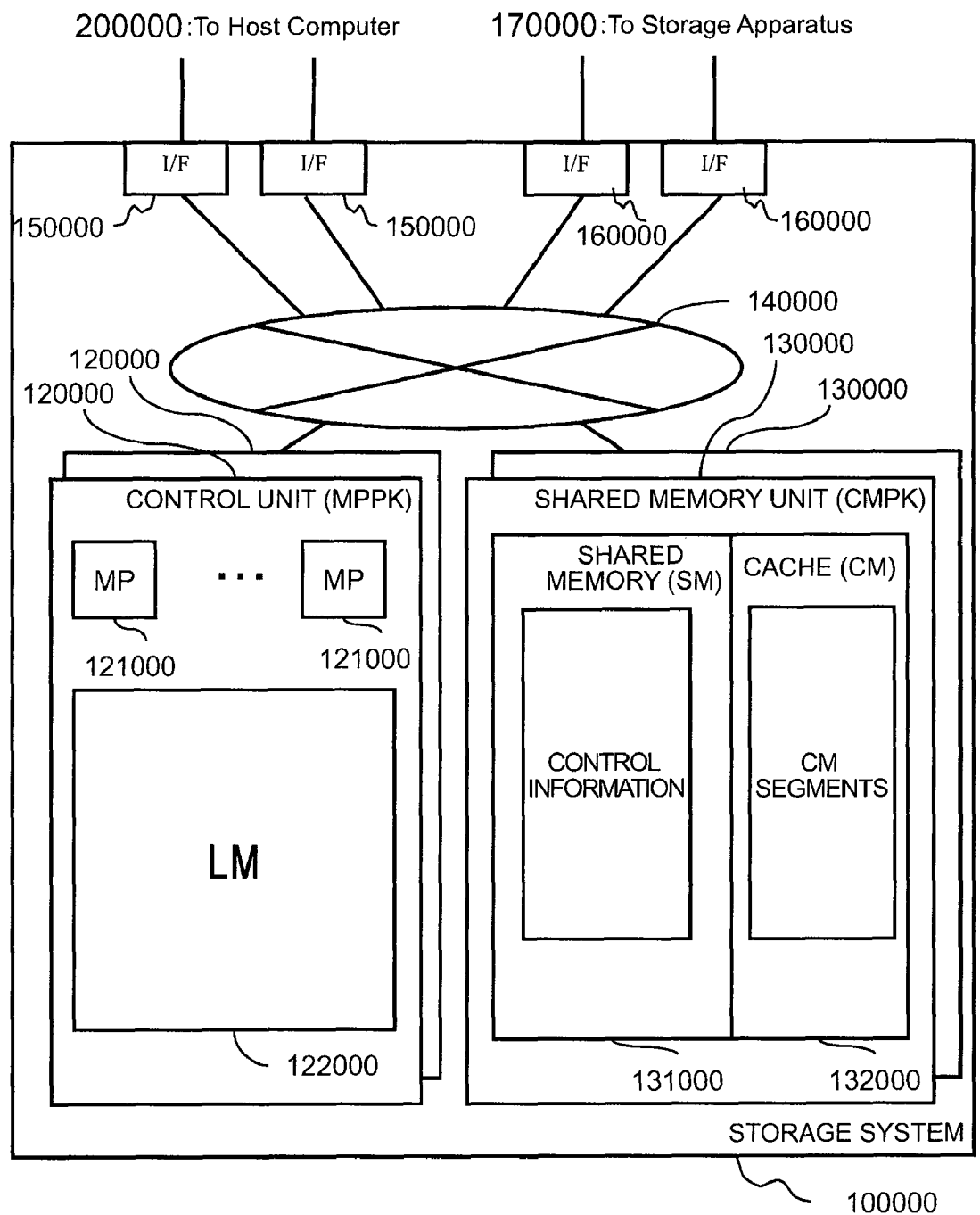
FIG. 2 is a block diagram showing an example of the configuration of a controller for the computer system in FIG. 1.

The control unit for the storage subsystem 110000 has a plurality of MPPKs 120000 as shown in FIG. 2, and an MPPK 120000 in charge of I/O processing with respect to an LDEV (the "MPPK in charge") is set to each LDEV according to a path management table 151000. The authority of the MPPK in charge of the input/output processing with respect to an LDEV is hereinafter referred to as the "LDEV ownership." The LDEV number correspondence table 131600 is stored by a storage administrator in a control information storage area in the CMPK 130000.

The path management table 151000 shown in FIG. 27A has entries, each of which includes an LUN field and an MPPK number (MPPK#) field. The path management table has as many entries as the number of LUNs that can be designated to the host I/F 150000.

The LUN field stores a path name (identification information) for the host computer to refer to the relevant LDEV. The LUN field stores, for example, a logical unit number if the SCSI standard is used for communication with the host computer.

A plurality of LUNs may be defined with respect to the same LDEV. Each MPPK judges whether it should execute processing on access from the host computer or not by referring to the LDEV number correspondence table 131600 and the LUN temporarily stored in the CMPK 130000 and included in the access from the host computer.

Referring back to FIG. 1, the service processor (SVP) 180000 is a device for maintaining and managing the storage system 100000. The service processor (SVP) 180000 is a computer such as a notebook personal computer; and it sets configuration information about each MP 121000, and executes settings relating to a change of the configuration of the storage subsystem 110000; and if a failure occurs in a package such as an MPPK 120000 in the storage subsystem, the SVP 180000 executes various processing such as a change of the configuration information relating to the MPPK, for example, blocking of the package, in order to prevent other MPPKs from using the failure part.

The internal network 140000 is connected to the MPPK 120000, the CMPK 130000, the host I/Fs 150000, and the disk I/Fs 160000. The internal network 140000 serves to switch between elements to be connected from among the above-described elements, and is realized by, for example, an LSI (Large Scale Integration). The internal network 140000 may be realized by a bus.

FIG. 2 is a detailed block diagram of the storage subsystem 110000. FIG. 2 shows that there are a plurality of MPPKs 120000 and a plurality of CMPKs 130000, and FIG. 2 also shows the detailed configuration of each package.

Each CMPK 130000 includes a shared Memory (SM) 131000 for recording the control information and a Cache Memory (CM), and is connected to the MPPKs via the internal network 140000. The CMPK is a volatile memory such as a DRAM (Dynamic Random Access Memory). The SM 131000 and the CM 132000 may be constituted from physically different DRAMs or constituted by logically dividing physically the same DRAM.

The CM 132000 is a cache memory generally used to speed up access to host data stored in the storage devices 171000. The CM 132000 enables the MPPK 120000 to have high-speed access to data which is frequently input/output to/from the host computer 200000, by temporarily storing part of the host data stored in the storage devices 171000.

The CM 132000 manages a memory space by dividing it into segments of a fixed length. These segments are called "cache segments (CM segments)." The size of a cache segment is arbitrary. For example, the size of one segment is 4 KB (kilobytes).

Also, the storage subsystem 110000 may logically divide the cache area and the size of a segment may vary for each divided area.

Figure 6:
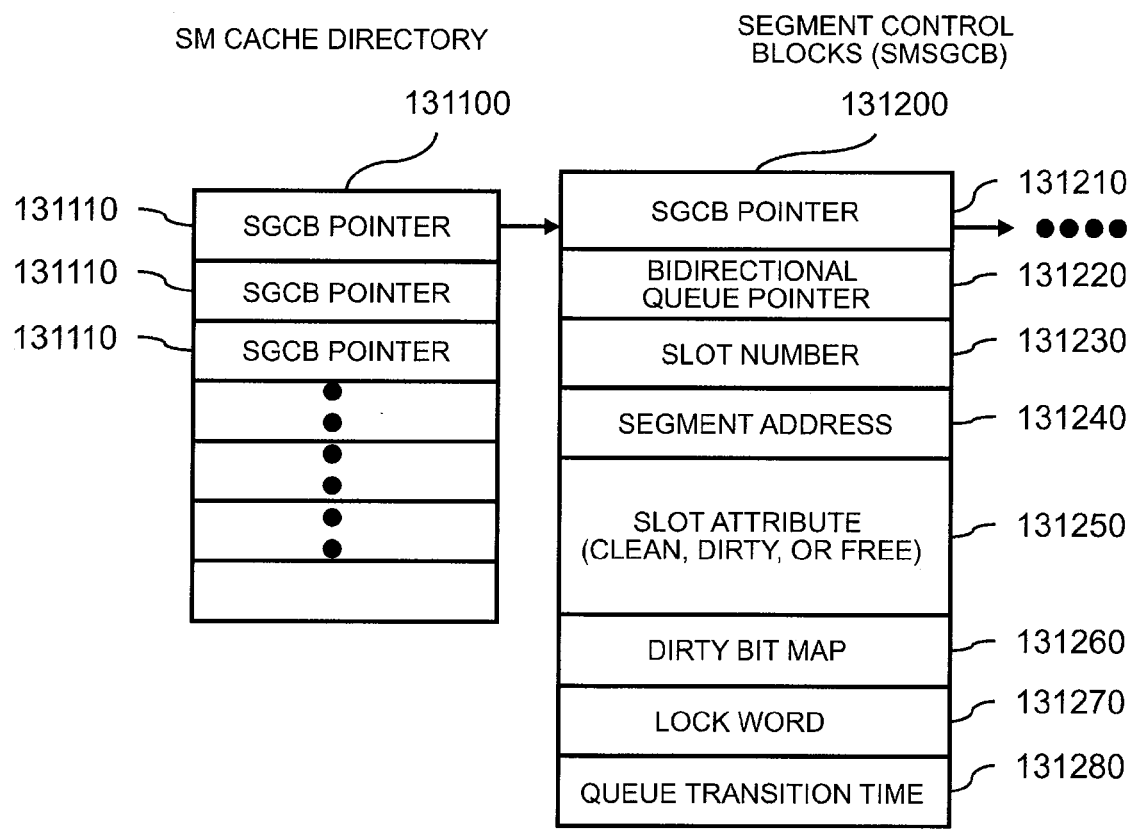
FIG. 6 is a block diagram showing the configuration of a cache directory and cache segment control blocks.

The SM 131000 stores cache control information to be used by the MP to control the CM 132000. The cache control information is information used to manage the above-described CM segments. The management structure of the CM segments is as shown in FIG. 6 described later.

In the storage system 100000, configuration information for managing each component such as the MPPK 120000, the CMPK 130000, and the host I/F 150000 in the storage subsystem 110000 is stored as the control information in the SM 131000. The cache control information and the configuration information will be hereinafter collectively referred to as the "control information."

Each MPPK 120000 includes one or more MPs 121000 and one or more LMs 122000, which are connected via an internal bus.

Each MP 121000 for the MPPK 120000 can communicate with any of other MPPKs 120000, CMPKs 130000, host I/Fs 150000, and disk I/Fs 160000 by using the internal network 140000 as the intermediary of communication. In other words, all the MPs refer to the CMPKs 130000.

FIG. 27B shows an example of the LDEV number correspondence table which is stored as the configuration information in the SM 131000. The LDEV number correspondence table 131600 stores entries, each of which is constituted from an I/F number (I/F#) field 131610, an LUN field 131620, and an LDEV number (LDEV#) field 131630.

The I/F number field 131610 stores the identification number of the host I/F 150000. The LUN field 131620 stores the logical unit number to be designated by the host computer 200000 in order to refer to an LDEV. The LDEV number field 131630 stores LDEV identification information (LDEV number) corresponding to the LUN of the same entry, which is received by the I/F number of the same entry.

This LDEV number correspondence table enables the MP 121000 to identify the LDEV number based on the LUN relating to an input/output request received from the host I/F 150000 and the number of the host I/F 150000 received together with the input/output request.

The LDEV number correspondence table 131600 is stored in the SM 131000 and the LM 122000. The LDEV number correspondence table 131600 stored in the SM 131000 has entries corresponding to all the LDEVs in the storage system 100000. On the other hand, the LDEV number correspondence table 131600 stored in the LM 122000 has entries corresponding to the LDEVs whose ownership is held by the MPPK 120000 to which the LM 122000 belongs.

The MP 121000 can promptly identify the LDEV number of the LDEV concerning which it has the ownership and which is the target of an input/output request, by referring to the LDEV number correspondence table 131600 in the LM 122000 for the MPPK 120000 which the MP 121000 itself belongs.

Figure 3:
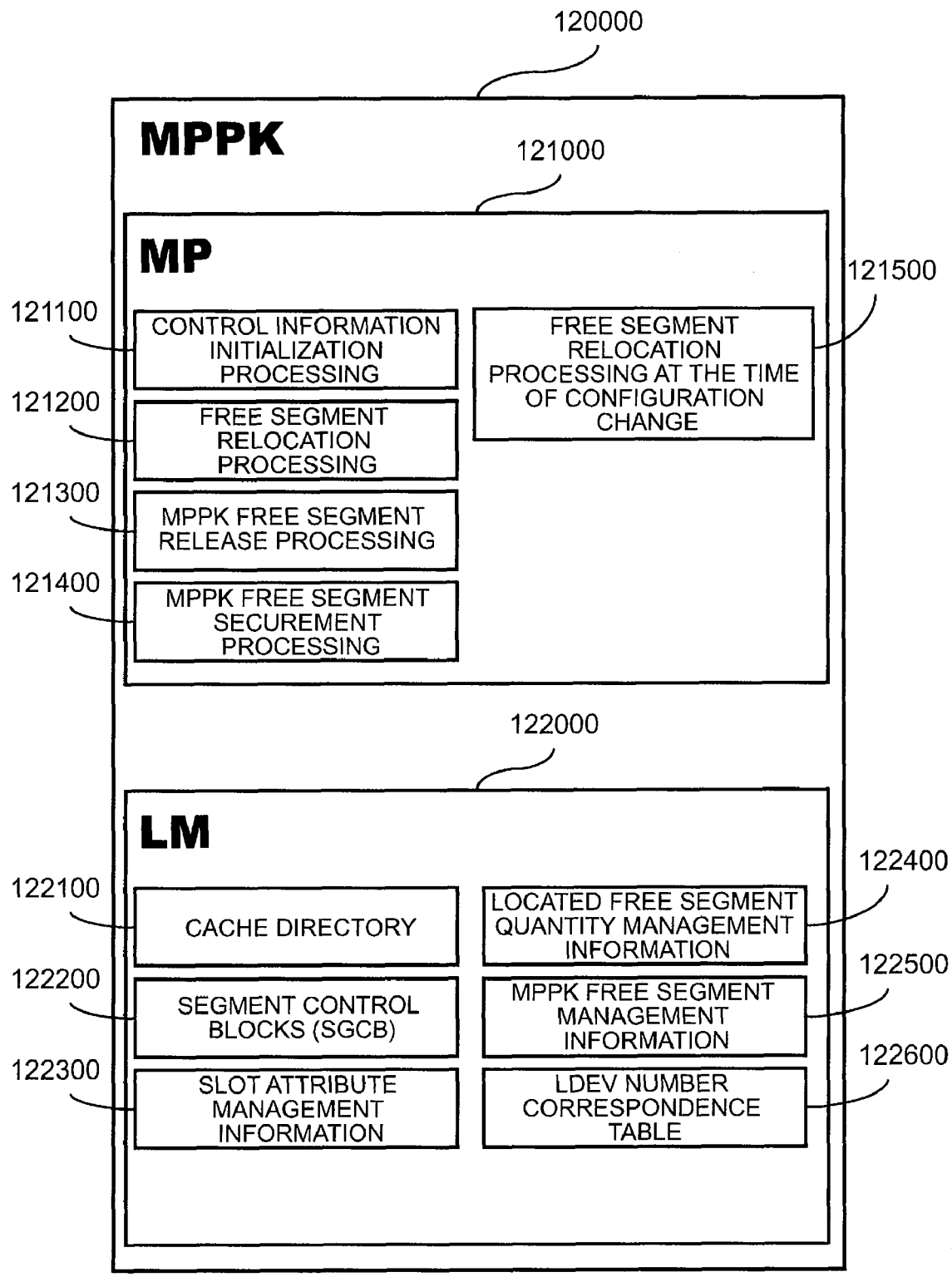
FIG. 3 is a block diagram showing an example of the logical configuration of the control unit.

FIG. 3 is a block diagram showing an example of the logical configuration of the MPPK. The LM 122000 is an area for storing programs and data for processing executed by the MP 121000 or a work area for storing data used for processing executed by the MP 121000. Each MP 121000 of a plurality of MPs processes a read command or a write command received from the host computer 200000 via the host I/F 150000, by executing the programs stored in the LM 122000. Read processing and write processing executed by the MP 121000 will be explained later with reference to FIGS. 19 and 20.

The MP 121000 executes control information initialization processing 121100, free segment relocation processing 121200, MPPK free segment release processing 121300, MPPK free segment securement processing 121400, and free segment relocation processing at the time of a configuration change 121500.

The LM 122000 includes a cache directory 122100, segment control blocks (SGCB) 122200, slot attribute management information 122300, located free segment quantity management information 122400, MPPK free segment management information 122500, and an LDEV number correspondence table 122600. The details of these elements will be provided in the later explanation.

Figure 4:
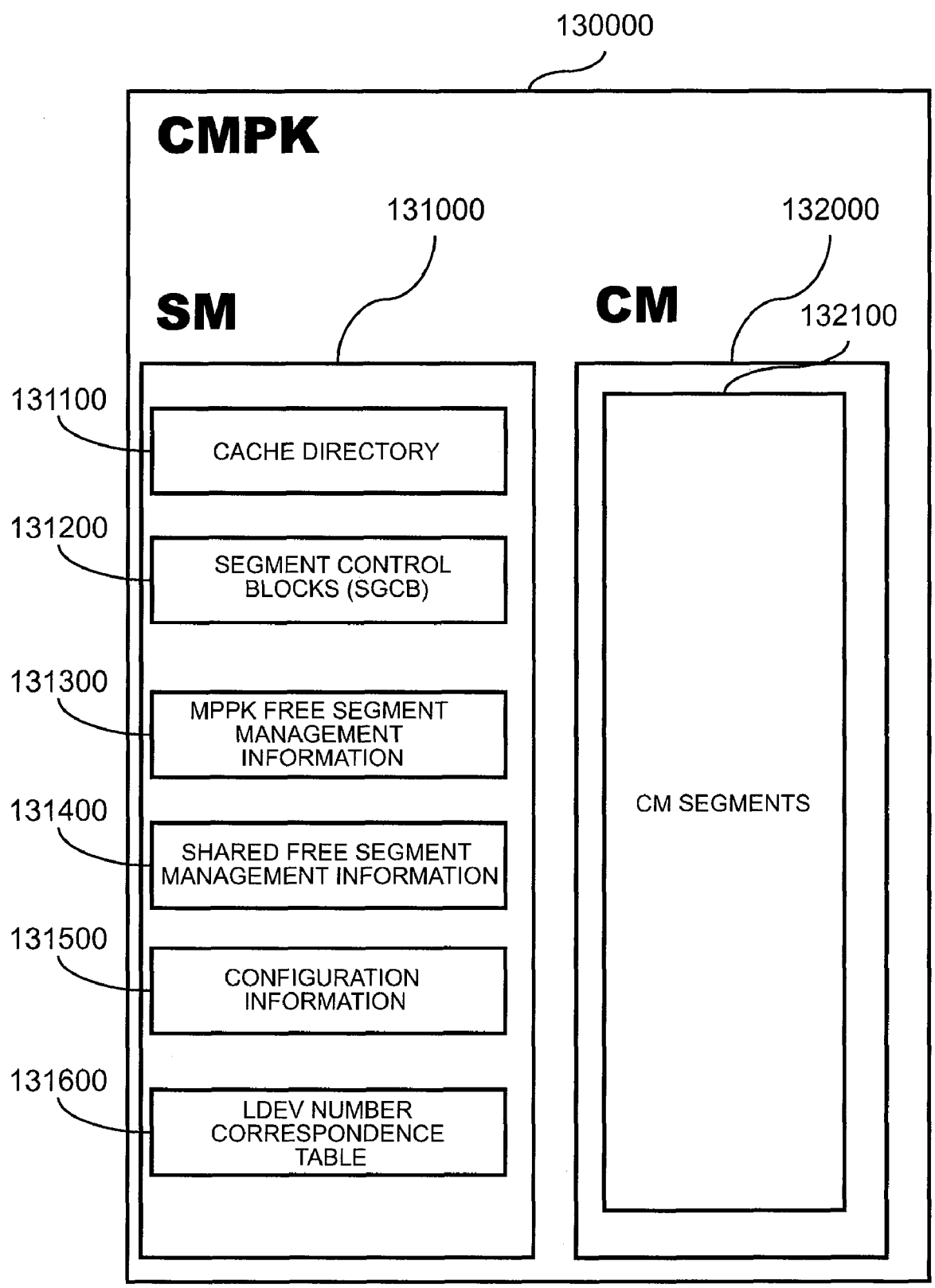
FIG. 4 is a block diagram showing an example of the logical configuration of a memory package.

FIG. 4 is a block diagram showing an example of the logical configuration of the CMPK 130000. The SM 131000 has a cache directory 131100, segment control blocks (SGCB) 131200, MPPK free segment management information 131300, shared free segment management information 131400, configuration information 131500, and an LDEV number correspondence table 131600. The CM 132000 has CM segments 132100.

Figure 5:
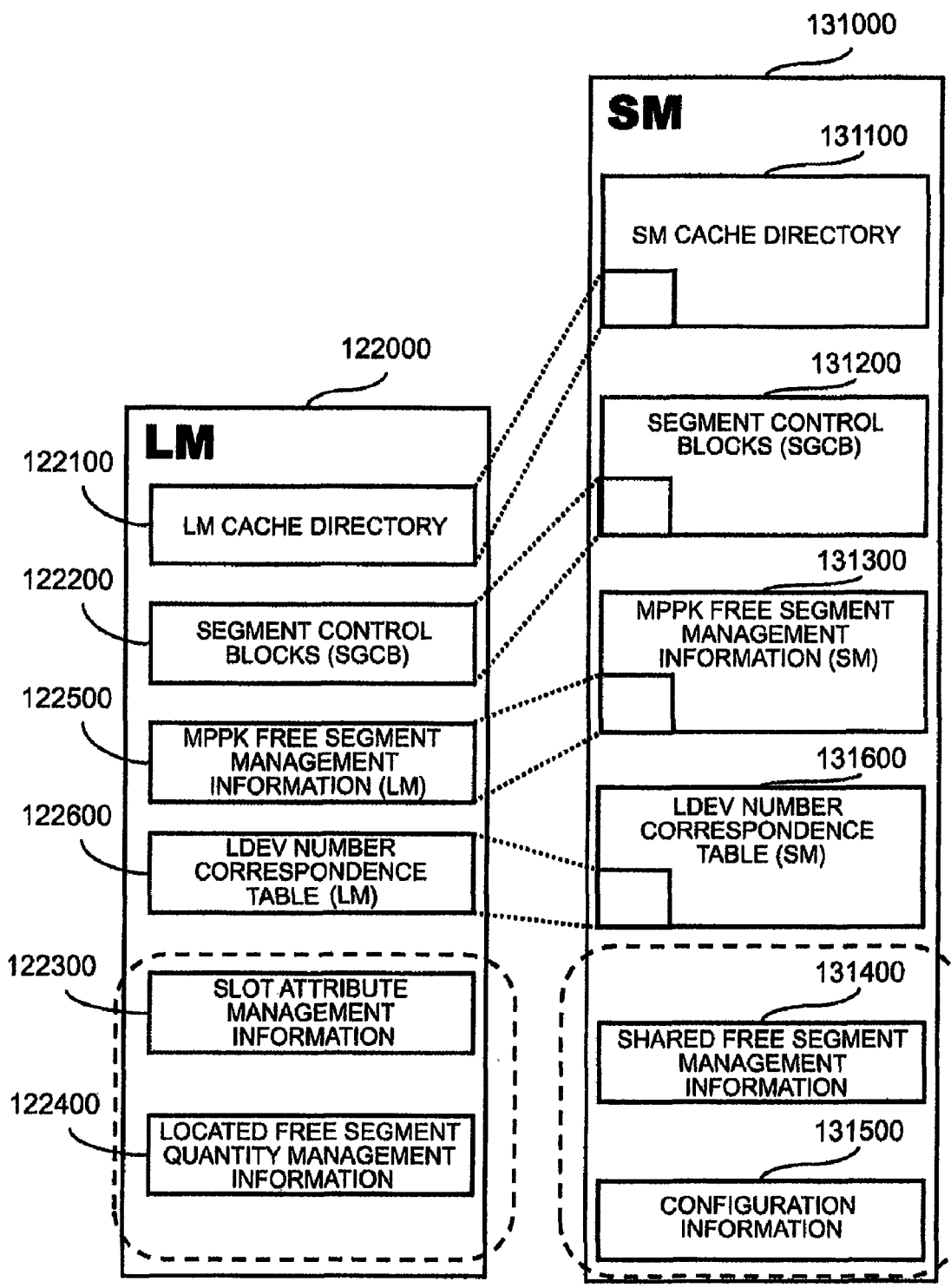
FIG. 5 is a block diagram showing the concept of localization of control information.

FIG. 5 is a block diagram showing that the control information in the SM 131000 is localized in the LM 122000. Localization means that the MP 121000 copies the control information in the SM 131000 to the LM 122000 and, at the same time, sets lock information for preventing other MPs from accessing the localized information in the LM122000.

In this way, each MP can reduce time to access the control information and can read the control information by using the control information which is copied from the SM 131000, which is far from the MP 121000, to the LM 122000 in the same package as the MP 121000 itself.

Incidentally, if a failure occurs in the MPPK, the data in the LM will be lost. So, when a MP updates the information in the LM, it also updates data in the SM at the same time in order to avoid losing the data in the LM.

However, since the capacity of the LM is smaller than that of the SM, the storage subsystem 110000 cannot use the LM to manage all the pieces of the control information in the SM. Therefore, the storage subsystem limits the control information to be localized to control information about LDEVs whose ownership is held by each MPPK, and to control information about cache segments, such as cache segments having a "free" attribute. The free segments means CM segments having the attribute of not storing dirty data or clean data as described later. The free segments include those which have the attribute of being allocated to a specific MPPK, and those which have the attribute capable of being allocated to all the MPPKs and managed as shared segments by the SM. The latter segments are named "shared free segments" in order to distinguish them from the former segments.

The control information relating to the free segments include the segment control blocks (SGCB) and the MPPK free segment management information as shown in FIG. 5. The control information relating to LDEVs include the LDEV number correspondence tables and the cache directories.

These pieces of control information are distinguished by checking whether they exist in the LM 122000 or in the SM 131000. Regarding the cache directories, one stored in the SM will be referred to as the "SM cache directory 131100" and one stored in the LM will be referred to as the "LM cache directory 122100."

Regarding the segment control blocks (SGCB), those stored in the SM will be referred to as the "segment control blocks (SMSGCB) 131200" and those stored in the LM will be referred to as the "segment control blocks (LMSGCB) 122200."

Regarding the MPPK free segment management information, one stored in the SM will be referred to as the "MPPK free segment management information (SM) 131300" and one stored in the LM will be referred to as the "MPPK free segment management information (LM) 122500."

Regarding the LDEV number correspondence tables, one stored in the SM will be referred to as the "LDEV number correspondence table (SM) 131600" and one stored in the LM will be referred to as the "LDEV number correspondence table (LM) 122600."

Furthermore, the LM 122000 has the slot attribute management information 122300 and the located free segment quantity management information 122400 as the pieces of control information which can be managed only by the LM. The SM 131000 has the shared free segment management information 131400 and the configuration information 131500 as pieces of control information which can be managed only by the SM.

FIG. 6 is a block diagram showing an example of the management structure of the CM segments. The CM segment management structure is a data structure used by the MP to identify a cache segment control block (SGCB: Segment Control Block) using the slot number.

Since the management structure stored in the LM 122000 is the same as the management structure stored in the SM 131000, FIG. 6 shows and describes the management structure of the SM for the sake of convenience. The same applies to similar situations.

Specifically speaking, since the management structure utilizes a hash table, a plurality of pointers (SGCB pointers) to the SBCBs 131200 are stored in the cache directory 131100 via the hash table.

The slot number is a management unit obtained by dividing an LDEV and is calculated from access destination information designated by a command from the host computer, such as the LUN and the LBA.

The slot size is, for example, of the same size as a CM segment or as N times (N is an integer equal to or more than two) as large as the size of a CM segment. In the latter case, addresses of N pieces of CM segments are described respectively in the segment address. The SGCB 131200 is a data structure for managing which CM segment is allocated to which slot.

The SGCB pointer 131110 is a hash value obtained by hashing the slot number. The slot number may be compressed by other methods.

As the MP follows the cache directory, the host computer can recognize which CM segment the data relating to the slot number, the access target of the host computer, is related to.

Since the hash value obtained by hashing the slot number itself according to the hash table becomes an index for the cache directory, the MP can immediately recognize where in the cache directory the relevant SGCB is located.

The cache directory is stored in the SM 131000 and the LM 122000. A hash table is prepared for each LDEV, and the SM cache directory 131100 stored in the SM 131000 has hash tables corresponding to all the LDEVs in the storage system 100000. On the other hand, the LM cache directory 122100 stored in the LM 122000 has only hash tables corresponding to the LDEVs whose ownership is held by the MPPK 120000 to which that LM 122000 belongs.

The segment control blocks (SGCB) are stored in the SM 131000 and the LM 122000. The segment control blocks (SMSGCB) 131200 stored in the SM 131000 correspond to all the segments of the cache (CM) 132000 in the storage system 100000. On the other hand, the segment control blocks (LMSGCB) 122200 stored in the LM 122000 correspond to cache segments whose ownership is held by the MPPK to which that LM belongs.

The number of CM segments that can be used by each MPPK is set as the target value 122410 in the located free segment quantity management information 122400 for each LM. Incidentally, the located free segment quantity management information 122400 will be explained later with reference to FIG. 8.

The SMSGCB 131200 includes descriptions of multiple kinds of information elements as shown in FIG. 6. The SMSGCB 131200 includes descriptions of an SGCB pointer 131210, a bidirectional queue pointer 131220, a slot number 131230, a segment address 131240, a slot attribute 131250, a dirty bit map 131260, a lock word 131270, and queue transition time 131280.

The SGCB pointer 131210 is a hash value obtained by hashing the slot number as described earlier.

The bidirectional queue pointer 131220 is a value indicating to which SGCBs a logical link is established in the LRU (Least Recently Used) management structure of the slot attribute described later, and the bidirectional queue pointer 131220 has two pointers because it is linked bidirectionally. The MP can identify, by means of this bidirectional pointer, which of the two other SGCBs logically linked to a certain SGCB is closer to the LRU side and which is closer to the MRU (Most Recently Use) side.

The segment address indicates the position of the CM segment in the cache memory. The slot attribute indicates the attribute (dirty, clean, or free) of the segment corresponding to the slot and exists in the LM. "Clean" is the attribute of a segment storing data (clean data) already stored in the storage devices 171000.

"Dirty" is the attribute of a segment storing data (dirty data) not stored in the storage devices 171000 yet.

"Free" is the attribute of a segment that can be a candidate for the area to store data. Specifically speaking, if the MP is to store data in the CM, it selects segments whose attribute is "free," from among a plurality of segments, and temporarily stores the data in those segments; and depending on differences of the control status with respect to the stored data, the attribute of the segments where the data has been stored is then changed from "free" to "clean" or "dirty."

The MP selects segments which may be freed, from among a plurality of segments whose attribute is "clean," and then changes the attribute of the selected segments from "clean" to "free." This will be referred to as "freeing." Cache segments whose attribute is "free" are called "free segments" as described above. Incidentally, the authority of the MPPK to use free segments will be hereinafter referred to as the "ownership" in the same manner as the authority over LDEVs.

The MP periodically stores dirty data of segments, which are classified as "dirty," in the storage devices 171000. After storing the dirty data, the MP changes the attribute of the segments from "dirty" to "clean."

When the attribute of the segments becomes "free," the MP releases the free segments from the cache directory. The released free segments are placed under the control of the MPPK having the ownership.

On the other hand, the MP associates cache segments whose attribute is "dirty" or "clean" with the slot numbers which are access targets of the host computer, through the intermediary of the cache directory. Accordingly, the MPPK controls and processes the CM segments associated with LDEVs whose ownership is held by the MPPK.

If a CM segment corresponding to a slot is divided into a plurality of areas, the dirty bit map 131260 is a set of bits corresponding to the respective areas. The MP sets a bit corresponding to an area where dirty data exists to be valid (for example, "1") and a bit corresponding to an area where dirty data does not exist to be invalid (for example, "0").

The dirty bit map 131260 is useful when the data write unit size of a write command issued from the host computer is not identical to the segment size. Specifically speaking, if the segment size is M times (M is an integer equal to or more than two) as large as the write unit size, a dirty bit map is constituted from a set of M pieces of bits for one segment.

Since the minimum unit of access (I/O) from the host computer 200000 according to SCSI is 512 bytes, if the segment size is 4 kb, the dirty bit map is 8 bits (4 kB/512 B=8 bits).

The lock word 131270 is information used to identify an MPPK to which localization has been applied, and includes, for example, the MPPK number to which localization has been applied.

The queue transition time 131280 means time when the SGCB connects to a slot attribute management queue.

Figure 7A:
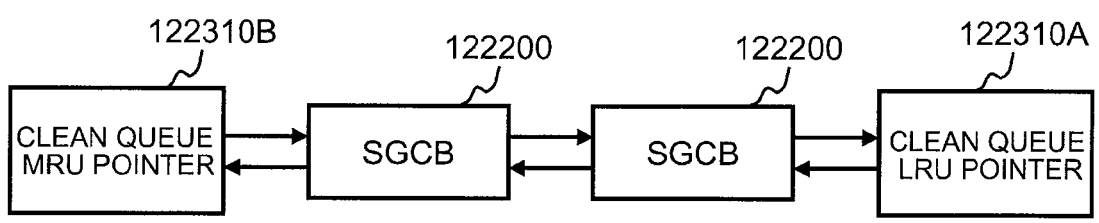
FIG. 7A is a block diagram showing the configuration of clean queue management information.
Figure 7B:
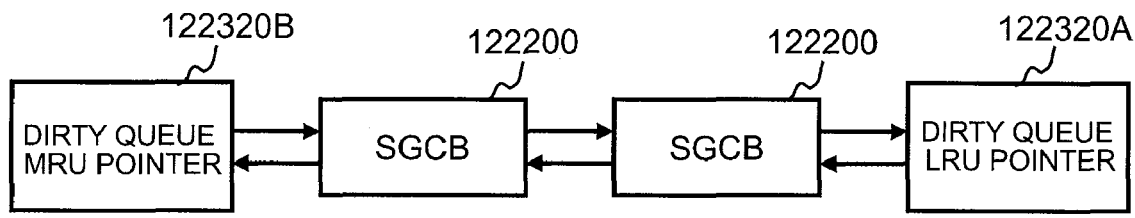
FIG. 7B is a block diagram showing the configuration of dirty queue management information.
Figure 7C:
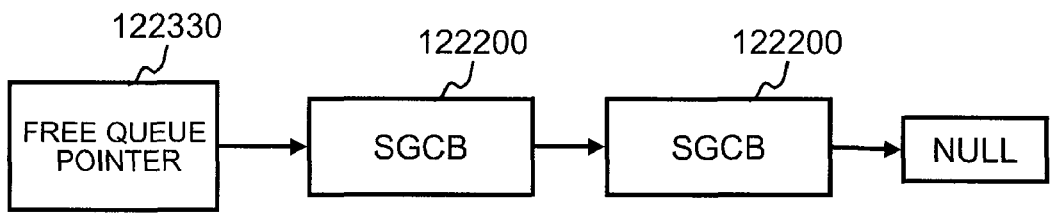
FIG. 7C is a block diagram showing the configuration of free queue management information.

FIGS. 7A to 7C show examples of the management structure of the cache directory 131100. FIG. 7A is a block diagram showing the management structure of queues for managing data which is "clean" (clean queues). LRU management is applied to the management of "clean" data.

The LRU management is achieved by managing the LRU of "clean" data existing in the CM 132000 by using queues.

Segment control blocks (SGCB) whose slot attribute 131250 is "clean" are linked sequentially between an MRU pointer and an LRU pointer.

It is shown that data stored in a CM segment specified by the SGCB 122200 linked to the clean queue LRU pointer 122310A is data which is the least recently used data in the past from among the "clean" data existing in the CM segment.

The length of time elapsed from the last use of the SGCB 122200 linked to the LRU pointer 122310A for the relevant queue, that is, from the last access by the MP, is clean queue LRU time (clean LRU time).

The clean LRU time can be obtained by calculating a difference between the current time and the queue transition time managed in the SGCB 122200 linked to the clean queue LRU pointer 122310A.

To the contrary, it is shown that data described in a CM segment specified by the SGCB 122200 linked to the MRU pointer 122310B for the clean queue is MRU, that is, most recently used data. Every time new CM data is used (accessed), the SGCB 122200 corresponding to the used data is inserted between the clean queue MRU pointer 122310B and the SGCB 122200 linked thereto.

FIG. 7B is a block diagram showing the queue structure for managing data which is "dirty." This is similar to FIG. 7A and manages the LRU/MRU of "dirty" data existing in the CM. The length of passage of time elapsed from the last use of the SGCB 122200 linked to a dirty queue LRU pointer 122320A is dirty queue LRU time (dirty LRU time).

FIG. 7C shows the queue (free queue) structure for managing free segments. SGSBs whose slot attribute is "free" should only be managed and the management of LRU/MRU is unnecessary.

Therefore, one of the two pointers contained in the bidirectional queue pointer is used, while, for example, a value meaning "invalid" is set to the other pointer. The free queue pointer 122330 is linked to one or more SGSBs whose slot attribute is "free." The SGCB at the end of this link structure is associated with a value meaning "end," for example, "NULL."

Figure 8:
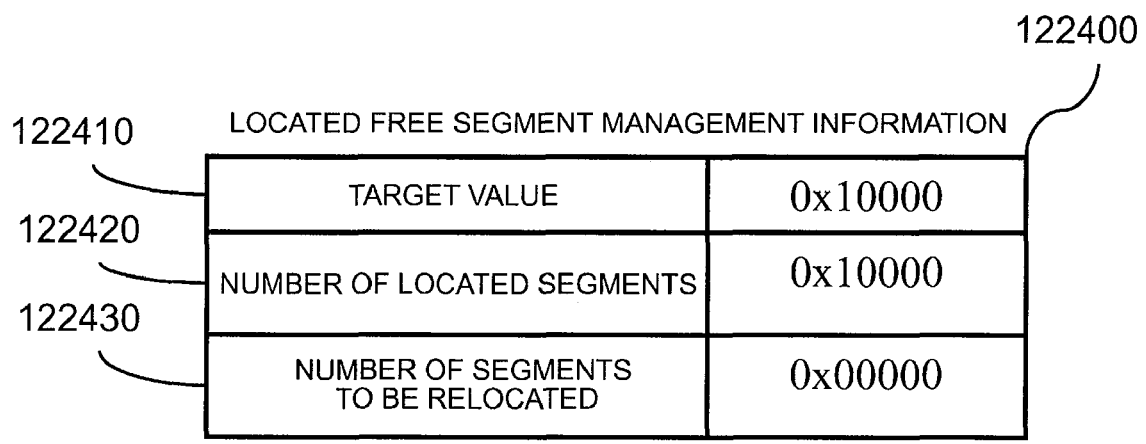
FIG. 8 is a management table showing the configuration of information for managing the number of free segments already located in a controller.

FIG. 8 is an example of the located free segment quantity management information 122400 (FIG. 5). The located free segment quantity management information includes a target value 122410, the number of located (free) segments 122420, and the number of (free) segments to be relocated 122430.

The target value 122410 is a value that defines how many free segments should be located in each MPPK; and the target value 122410 is updated, for example, when the administrator of the storage subsystem initializes the configuration information or changes the configuration of the storage subsystem. An example of the latter case is where a CMPK is added. When adding a CMPK, the target value is changed in order to evenly allocate the capacity of the newly-added cache memory to each MPPK.

The number of located segments is normally constant and is identical to the target value. However, if the ownership of an MPPK over LDEVs is to be transferred to another MPPK, the number of located segments increases or decreases. The case where the LDEV ownership is transferred is, for example, when increasing or decreasing the MPPKs, and the purpose of transfer of the LDEV ownership is to equalize the I/O load on LDEVs among the MPPKs. When transferring the LDEV ownership, it is necessary to copy the control information, which is localized from the SM to the LM and belongs to the LDEV ownership, to the LM for the transfer destination MPPK. The "control information which belongs to the LDEV ownership" herein means the LM cache directory 122100, the LMSGCB 122200 associated with the LM cache directory, and the LDEV number correspondence table 122600 as described earlier. The LMSBCB 122200 associated with the LM cache directory indicates SGCBs for segments of the relevant LDEVs whose data accessed by the host computer is cached, that is, segments whose attribute is clean or dirty. When transferring the LDEV ownership, all these pieces of control information are moved to the LM for the transfer destination MPPK. As a result, the number of located segments in the MPPK which is the LDEV ownership transfer source decreases by the number of segments whose attribute is clean or dirty. At the same time, the number of located segments in the transfer destination MPPK increases by the same number of segments as those described above. As a result of transfer of the LDEV ownership as described above, the I/O load among the MPPKs is equalized, but the number of located segments for each MPPK becomes unbalanced, thereby degrading the cache use efficiency of the MPPK whose number of located segments has decreased, and also degrading the performance.

The number of located segments 122420 is information for managing the number of segments allocated to each MPPK. The number of located segments 122420 can be found by calculating the total number of the segment control blocks (LMSGCB) 122200 for each MPPK.

The number of segments to be relocated 122430 is the number of cache segments that needs to be allocated to the MPPK or released from the MPPK when relocating the free cache segments among the plurality of MPPKs; and the number of segments to be relocated 122430 is an absolute value of the difference between the target value 122410 and the number of located segments 122420.

Figure 12:
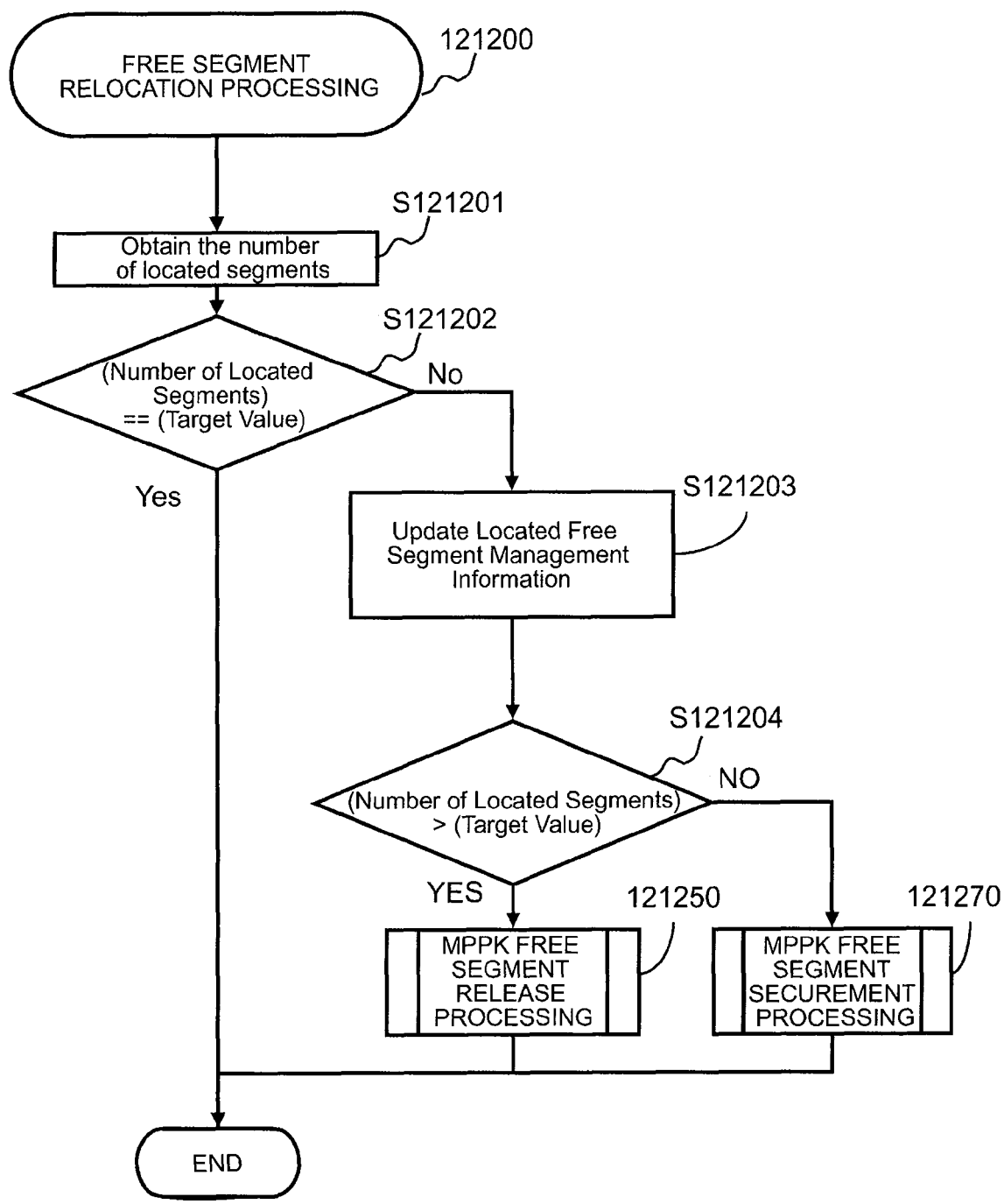
FIG. 12 is a flowchart illustrating free segment placement processing.

The target value is usually identical to the number of located free segments, and the number of segments to be relocated is "0." On the other hand, if the target value is different from the number of located free segments as in the above-described case of transfer of the MPPK's ownership over LDEVs, free segment relocation processing is executed as shown in FIG. 12 so that the number of located segments becomes identical to the target value.

Figure 9A:
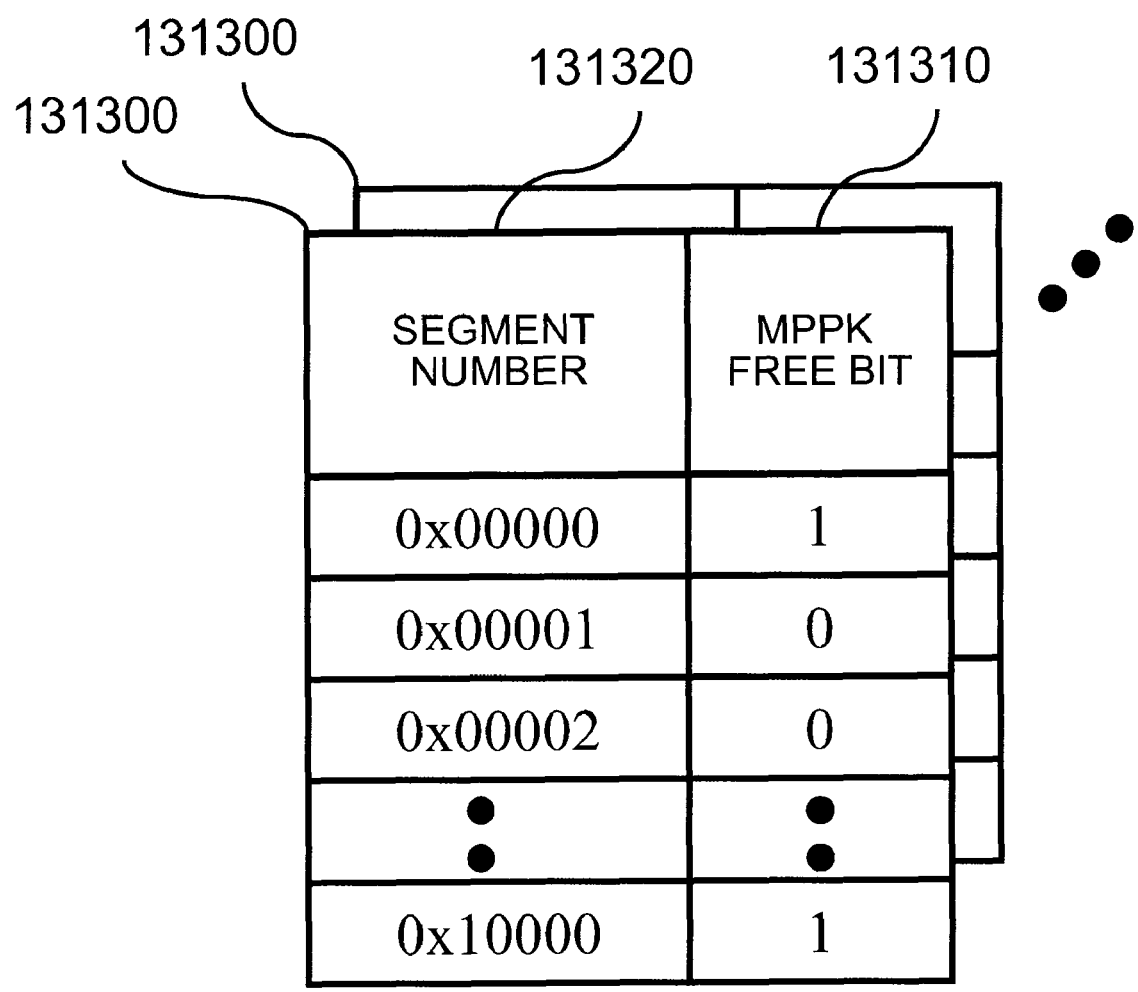
FIG. 9A shows an example of a management table for the MPPK free segment management information.

FIG. 9A is an example of a management table for the MPPK free segment management information (131300, 122500) (FIG. 5). One table corresponds to one MPPK. The MPPK free segment management information 131300 is information for managing the free segments located in each MPPK (MPPK free segments). The MPPK free segment management information is used to manage which segment is located in which MPPK. Specifically, when an MPPK is blocked, free segments allocated to the blocked MPPK are identified by referring to the MPPK free segment management information in the SM, so that another MPPK can take over such free segments.

The MPPK free segment management information is recorded in the SM, and the MP can promptly refer to the MPPK free segment management information by copying it to the LM.

As explained earlier with reference to FIG. 5, the MPPK free segment management information stored in the LM 122000 is the MPPK free segment management information (LM) 122500, which should be distinguished from the MPPK free segment management information (SM) 131300 that is the MPPK free segment management information stored in the SM 131000.

The LM stores the MPPK free segment management information for the MPPK to which that LM belongs. Meanwhile, the SM stores the MPPK free management information for all the MPPKs. Since the data structures of both pieces of the MPPK free management information are the same, FIG. 9A shows the MPPK free segment management information (SM) 131300 as a representative example.

As shown in FIG. 9A, the free segments are managed by bit maps. Specifically speaking, bit "1" is set to a segment which has been already located in a certain MPPK and whose slot attribute is classified as "free," and bit "0" is set to a segment whose attribute is "dirty" or "clean." The bit map is defined by bit information for all the segments. This bit is named an "MPPK free bit 131310."

The segment number 131320 is a unique number decided for the segment address 131240 in an SGCB and is a number specific to a CM segment in the storage subsystem. The segment number may be defined so that it becomes a series of consecutive numbers with respect to the segment address. For example, dividing the segment address by the segment size will result in consecutive numbers. Incidentally, the free segments may be managed by queues as shown in FIGS. 7A to 7C, instead of the bit maps.

Figure 9B:
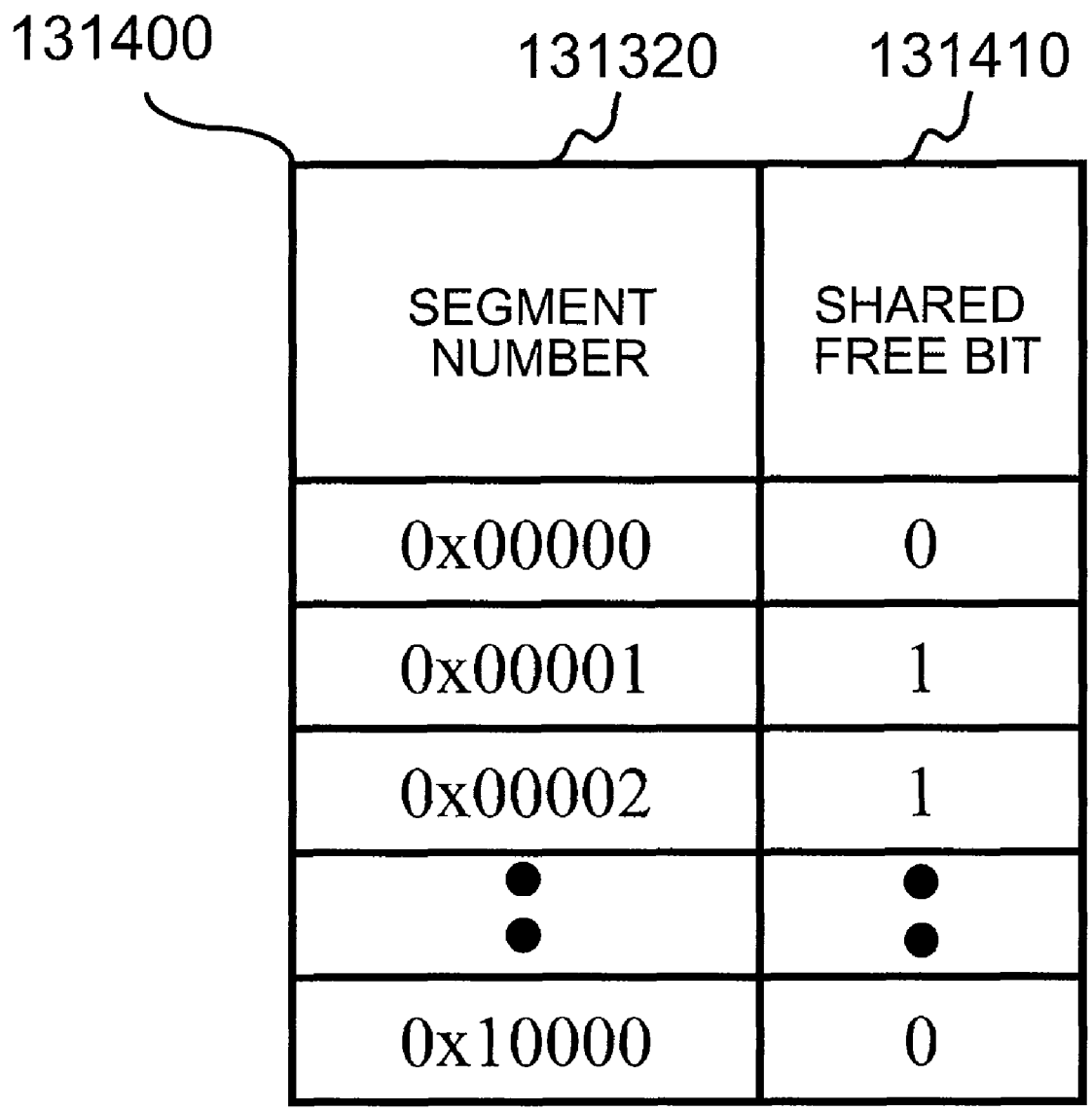
FIG. 9B shows the shared free segment management information table.

FIG. 9B is the shared free segment management information table 131400 (FIG. 5). The shared free segment management information table 131400 is not located in any MPPK and is management information for managing free segments having the attribute of allowing any MPPK to use them (shared free segments). The shared free segment management information exists in the SM without being localized to any LM.

Whether cache segments have the shared free attribute or not is managed by a bit map as shown in FIG. 9B in the same manner as in the MPPK free segment management information shown in FIG. 9A. Incidentally, this bit is named a "shared free bit 131410."

As an additional remark, the segment number 131320 for the shared free segment management information is in common with the segment number 131320 for the MPPK free segment management information.

FIG. 10A is a block diagram showing "CM segment allocation" and FIG. 10B is a block diagram for explaining "segment placement." Now, the difference between the "CM segment allocation" and the "segment placement" will be described below.

The "CM segment allocation" is an action to connect the SGCB 131200 to the cache directory 131100 as shown in FIG. 6. By connecting the SGCB to the cache directory, the slot number of an LDEV which is the access target of the host computer 200000 is associated with a CM segment and data is transferred to the CM segment. Details of "CM segment allocation" processing will be explained later with reference to FIG. 21.

The "segment placement" is an action performed by a specific MPPK to lock an SGCB in the SM (SMSGCB) and copy the locked SGCB to the LM. The MP exclusively associates the slot number of LDEVs which are the access targets of the host computer 200000 with the CM segments whose ownership is held by that MP by referring to the SGCBs in the LM for the MPPK to which the MP itself belongs.

The "segment placement" includes processing for "segment relocation." The "segment relocation" processing will be explained later with reference to FIG. 12. Incidentally, the MPPK can transfer data to the CM segments more promptly by referring to the segment control blocks (LMSGCB) 122200 in the LM than by referring to the SMSGCB 131200 in the SM.

A plurality of actions relating to the system shown in FIG. 1 will be explained below. FIG. 11 is a flowchart illustrating processing for initializing the control information. Incidentally, "steps" in FIG. 11 and any subsequent flowcharts described later are abbreviated as "S." The control information initialization processing (121100 in FIG. 3) is processing executed by the MP when the storage administrator first activates the storage subsystem 100000. The MP sets the control information to the SM 131000 and the LM 122000 based on the configuration information about the storage system 100000, for example, the number of MPPKs 120000 mounted on the storage system and the capacity of the cache (CM) 132000. Incidentally, the control information initialization processing 121100 is executed by one MP in the storage system 100000. Incidentally, at the time of initialization, for example, all the CM segments are evenly divided and allocated to each MPPK.

In step 121101, the MP calculates the capacity of the CMs mounted on all the CMPKs in the storage subsystem 100000 based on the configuration information 131500, defines the segment control blocks (SMSGCB) 131200 with respect to the total capacity to the SM, and thereby initializes the value of each piece of information in the SGCBs.

In step 121102, the MP defines the MPPK free segment management information (SM) 131300 for all the MPPKs and sets this management information to the LM for each MPPK. Since any free segment is not placed in the MPPKs at this moment, the MPPK free bits (FIG. 9A) corresponding to all the segment numbers are "0." Subsequently, the MP defines the shared free segment management information 131400 with respect to the SM. At this moment, the shared free bits corresponding to all the segment numbers are "1" (FIG. 9B).

In step 121103, the MP identifies an MPPK which has the ownership over LDEVs in accordance with the path management table 151000 (FIG. 27A) and the LDEV number correspondence tables (FIG. 27B) and copies the entries corresponding to the LDEVs, whose ownership is held by this MPPK, from the LDEV number correspondence table (SM) 131600 to the LDEV number correspondence table (LM) 122600.

In step 121104, the MP copies the entries in the SM cache directory 131100 corresponding to the LDEVs, whose ownership is held by the MPPK, as the LM cache directory 122100 to the LM belonging to that MPPK in accordance with the path management table 151000 as shown in FIG. 5.

In step 121105, the MP sets the located free segment quantity management information 122400 in the LM 122000 for each MPPK. Specifically speaking, the MP calculates the number of free segments to be located in each MPPK and registers it in the "target value 122410" field and the "number of located segments 122420" field (FIG. 8).

The number of free segments to be located in each MPPK is, for example, a value obtained by dividing the total number of segments in all the CMPKs for the storage system 100000 evenly by the total number of MPPKs.

In step 121106, the MP identifies segments corresponding to the free segments located in each MPPK from the segment control blocks in the SM (SMSGCB) 131200 in accordance with the located free segment quantity management information 122400, reads the SGCBs of the identified segments from the SMSGCB, and copies them to the segment control blocks in the LM (LMSGCB) 122200 for the MPPK where these segments are located, as shown in FIG. 5.

In step 121107, the MP also copies the MPPK free segment management information (SM) 131300 in the SM to the MPPK free segment management information (LM) 122500 in the LM in the same manner as in step 121106.

FIG. 12 is a flowchart illustrating the free segment relocation processing. The free segment relocation processing 121200 is executed in order to judge whether or not the number of free segments located in each MPPK after initialization of segments in each MPPK as described in FIG. 11 is identical to the previously set target value 122410. If the number of free segments located in each MPPK is smaller than the target value, free segments are secured in the relevant MPPK so that the number of free segments becomes equal to the target value; and if the number of free segments located in each MPPK exceeds the target value, free segments are released from the relevant MPPK to the shared free state.

This processing is executed during control information initialization processing in FIG. 11 and then also repeatedly executed by the MP at regular intervals during normal operation of the storage system by referring to a specified threshold value. When the administrator intends to change the configuration information, the MP is forced to execute the free segment relocation processing 121500 at the time of a configuration change without referring to the specified threshold value as a basis.

The free segments are placed in all the MPPKs, but all the MPs in each MPPK do not necessarily have to perform the free segment placement and it is only necessary for one representative MP to execute the free segment placement processing. The following explanation will be given, assuming that one MP for a certain MPPK executes this processing; however, the same processing will be also executed in other MPPKs. Furthermore, one representative MP in the MPPK may be decided in advance or replaced with a different MP every time the processing is executed.

The flowchart will be explained below. In step 121201, the MP calculates the number of located segments 122420 from the total number of the segment control blocks (LMSGCB) 122200 in its own MPPK. The MP then registers the obtained number of located segments in the located free segment quantity management information 122400 (FIGS. 5 and 8).

In step 121202, the MP checks if the number of located segments obtained in step 121201 is identical to the target value 122410 for its own MPPK (FIG. 8) or not, in order to determine whether it is necessary to relocate the free segments. If the number of located segments is identical to the target value 122410, relocation is unnecessary and, therefore, the MP terminates the processing without any further actions. If the number of located segments is not identical to the target value 122410, the MP performs relocation.

In step 121203, the MP obtains the number of segments to be relocated 122430 and registers it in the located free segment quantity management information 122400 (FIG. 8). The number of segments to be relocated 122430 is obtained by calculating an absolute value of difference between the target value 122410 and the number of located segments 122420 as described earlier.

In step 121204, the MP judges whether the number of located segments is larger than the target value or not, in order to decide the subsequent processing. If the number of located segments is larger than the target value, it means that more segments than are necessary for its own MPPK are located.

Incidentally, the target value is decided: (1) when it is directly changed by the user for whatever reason; (2) when the allocated amount changes along with a change of the configuration; or (3) by means of automatic tuning processing described later.

In order to make the number of located segments become equal to the target value, the MP invokes the MPPK free segment release processing 121300 (FIGS. 3 and 13) and releases as many MPPK free segments as the number of segments to be relocated 122430 from among the localized segments, that is, the segments allocated to the MPPK, from the state allocated to its own MPPK to which that MP belongs, in order to make them enter the shared free state by leaving the segments in the free state as they are, changing the segments in the dirty state to the clean state and then to the free state, and changing the segments in the clean state to the free state. When this is done, the segments to be made to enter the shared free state are selected in the order of the "free state," the "clean state," and the "dirty state" in order to maintain a cache hit rate.

On the other hand, if the number of located segments is smaller than the target value, the MP invokes the MPPK free segment securement processing 121400 (FIGS. 3 and 14) and secures as many shared free segments as the number of deficient segments by allocating them to its own MPPK.

Figure 13:
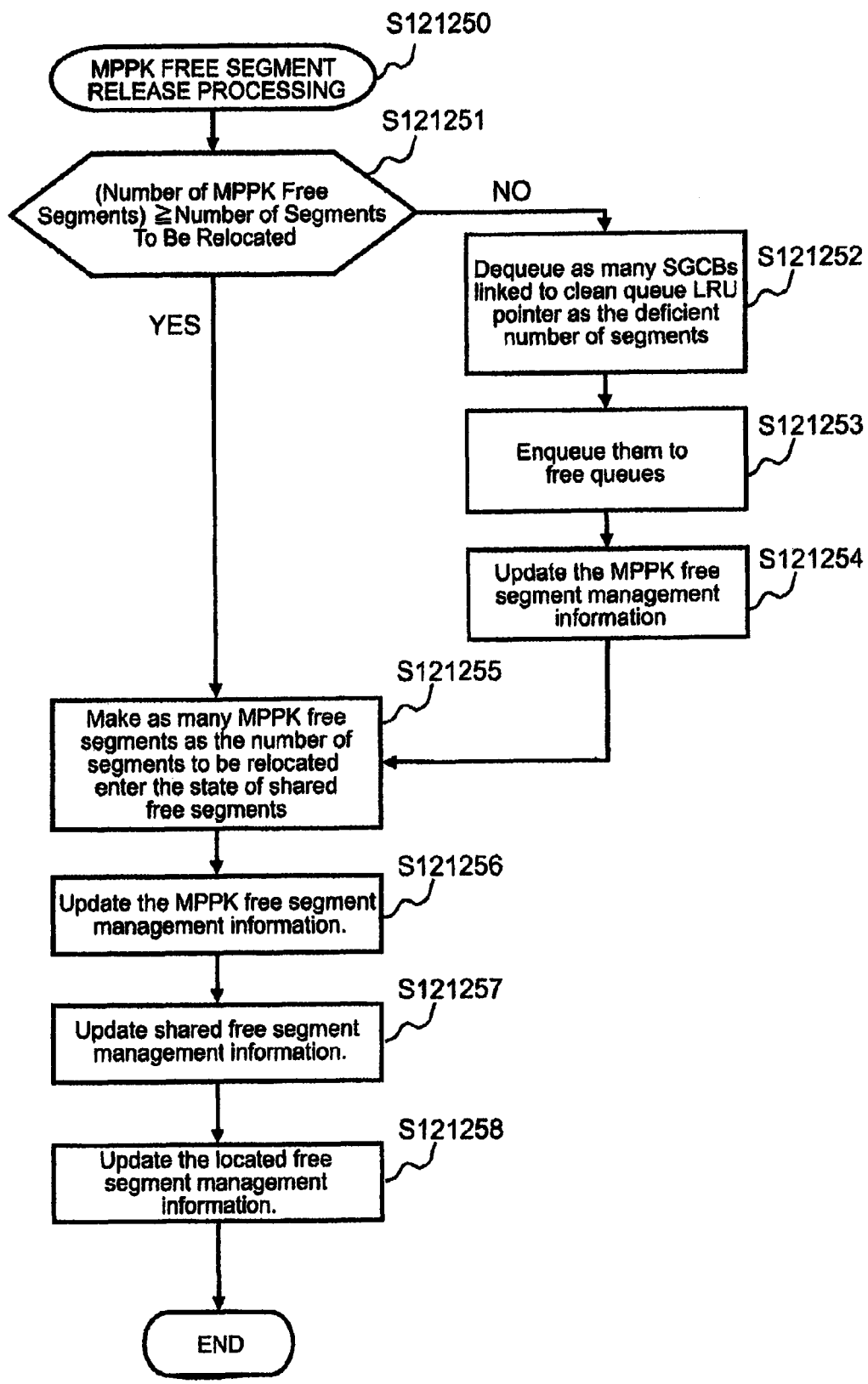
FIG. 13 is a flowchart illustrating processing for releasing free segments from a controller.

FIG. 13 is a flowchart illustrating the MPPK free segment release processing (FIG. 12). This processing is executed for each MPPK by the representative MP of each MPPK. In step 121251, the MP compares the number of MPPK free segments in its own MPPK with the number of segments to be relocated 122430 (FIG. 8) in order to check whether or not there are as many MPPK free segments that can be released as the number of segments to be relocated. The number of segments to be relocated 122430 is obtained by calculating an absolute value of difference between the target value 122410 and the number of located segments 122420 as described earlier.

The MP obtains the number of MPPK free segments by referring to the MPPK free segment management information (LM) 122500 and summing up the number of the segment numbers whose MPPK free bit (FIG. 9A) is "1." If it is found as a result of the judgment that the number of MPPK free segments is larger than or equal to the number of segments to be relocated, the MP proceeds to step 121255. If the number of MPPK free segments is smaller than the number of segments to be relocated, the MP proceeds to step 121252.

In step 121252, the MP frees the segments whose attribute is not "free" ("clean" or "dirty") as described earlier. The "clean" segments are given priority to be freed first.

When this happens, the MP dequeues as many SGCBs linked to the clean queue LRU pointer as the number of deficient segments (S121252). Then, the MP proceeds to step 121253. The number of deficient segments is obtained by subtracting the number of MPPK free segments from the number of segments to be relocated.

In step 121253, the MP enqueues the dequeued SGCBs to free queues, that is, links them to free queue pointers 122330.

In step 121254, the MP refers to the MPPK free segment management information (LM) 122500 (FIG. 5) and changes the MPPK free bits corresponding to the segment numbers of the segments freed in step 121253 to "1." Subsequently, the MP updates the MPPK free segment management information (SM) 131300 (FIG. 9A) in the same manner. The MP then proceeds to step 121255.

In step 121255, the MP makes only the number of segments to be relocated enter the shared free state. Specifically speaking, the MP destroys the lock word 131270 (FIG. 6) for the SMSGCBs corresponding to the free segments which are to be made to enter the shared free state, thereby releasing the lock. Subsequently, the MP preferably destroys the LMSGCBs. The MP then proceeds to step 121256.

In step 121256, the MP refers to the MPPK free segment management information (LM) 122500 (FIG. 9A) and changes the MPPK free bits corresponding to the segment numbers of the segments which have been made to enter the shared free state in step 121255 to "0." Furthermore, the MP updates the MPPK free segment management information (SM) 131300 (FIG. 5) in the same manner. The MP then proceeds to step 121257.

In step 121257, the MP refers to the shared free segment management information 131400 (FIG. 9B) and changes the shared free bits corresponding to the segment numbers of the segments which have been made to enter the shared free state in step 121255 to "1." The MP then proceeds to step 121258.

In step 121258, the MP refers to the located free segment quantity management information 122400 (FIG. 8) and updates the number of located free segments.

Figure 14:
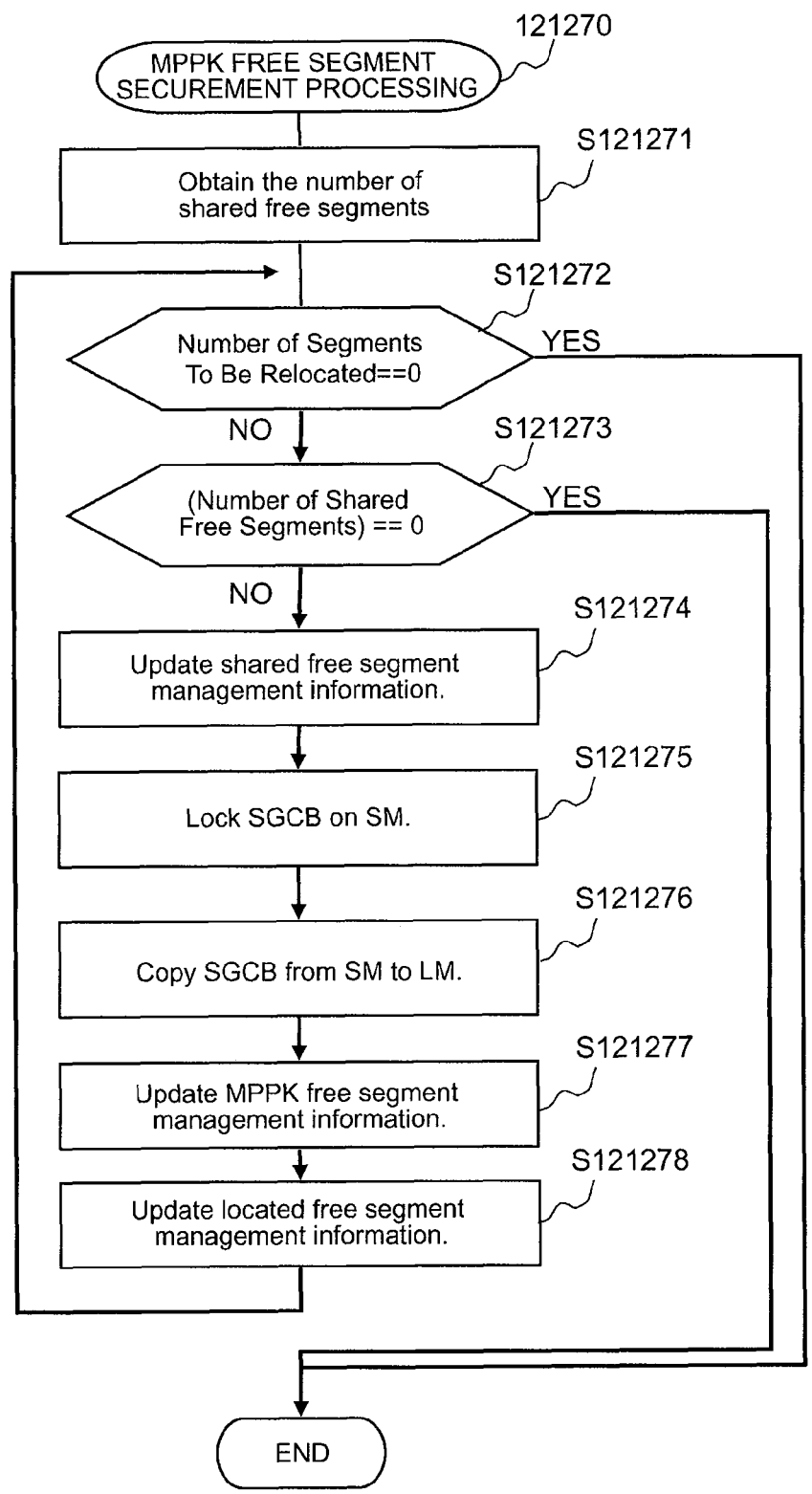
FIG. 14 is a flowchart illustrating processing for securing free segments in a controller.

FIG. 14 is a flowchart illustrating the MPPK free segment securement processing. The representative MP of each MPPK executes this flowchart. In step 121271, the MP obtains the number of shared free segments. Specifically speaking, the MP counts the number of the segment numbers whose shared free bit in the shared free segment management information 131400 (FIG. 9B) in the SM is "1." The MP then proceeds to step 121272.

In step 121272, the MP judges whether or not the number of segments to be relocated is equal to "0." If the number of segments to be relocated is equal to "0," the MP determines that all the segments as many as should be secured have been secured; and then terminates the processing. If the number of segments to be relocated is not equal to "0," the MP proceeds to step 121273.

In step 121273, the MP judges whether or not the number of shared free segments is equal to "0." If the number of shared free segments is equal to "0," the MP determines that there is no shared free segment which can be immediately secured; and then terminates the processing. If the number of shared free segments is not equal to "0," the MP proceeds to step 121274. Separately from this embodiment, if the number of shared free segments is equal to "0," another MPPK may release its MPPK free segments and it is possible to wait for them to enter into the shared free state. However, since this waiting time causes degradation of the MP's operation ratio, this might cause degradation of the performance of the storage subsystem. Since the free segment relocation processing is processing to be executed for the purpose of performance tuning, it is desirable to avoid any influence on the performance of the storage subsystem as much as possible. Therefore, in this embodiment as described above, if there is no shared free segment which can be immediately secured, the free segment securement processing is terminated immediately. Even if not all the necessary segments can be secured at this moment, there would be no problem because the free segment relocation processing is invoked at regular intervals. However, there is a possibility that time required to secure the necessary number of free segments might be extended considerably.

Incidentally, the basic policy of the free segment securement processing is described as follows. If there are any shared free segments, they are secured one by one. If as many shared free segments as the number of segments to be relocated are secured, the processing is terminated. Even if as many shared free segments as the number of segments to be relocated are not secured, if the number of shared free segments becomes "0," the processing is terminated. In this case, as illustrated in FIG. 28 (28A and 28B), the MP does not wait for release of segments from other MPPKs in order to eliminate the waiting time for the MP. Even if the segments cannot be secured at this moment, the free segment relocation processing will be executed after a certain amount of time; and the MP then judges again whether or not the free segments can be secured.

In step 121274, the MP refers to the shared free segment management information 131400 and selects one segment whose shared free bit is "1." The MP changes the shared free bit of that segment number to "0." The MP then proceeds to step 121275.

In step 121275, the MP sets the lock word for the SMSGCB corresponding to the segment number of the segment selected in step 121274. The MP then proceeds to step 121276.

In step 121276, the MP copies the SGCB locked in step 121274 to the LM. The MP then proceeds to step 121277.

In step 121277, the MP refers to the MPPK free segment management information (LM) 122500 (FIGS. 5 and 9A) and changes the MPPK free bit corresponding to the segment number of the segment selected in step 121274. The MP then proceeds to step 121278.

In step 121278, the MP refers to the located free segment quantity management information 122400 (FIG. 8), increases the number of located segments by one, and decreases the number of segments to be relocated by one. Subsequently, the MP returns to step 121272. The MP repeats step 121272 until the number of the shared free segments becomes zero.

Figure 15:
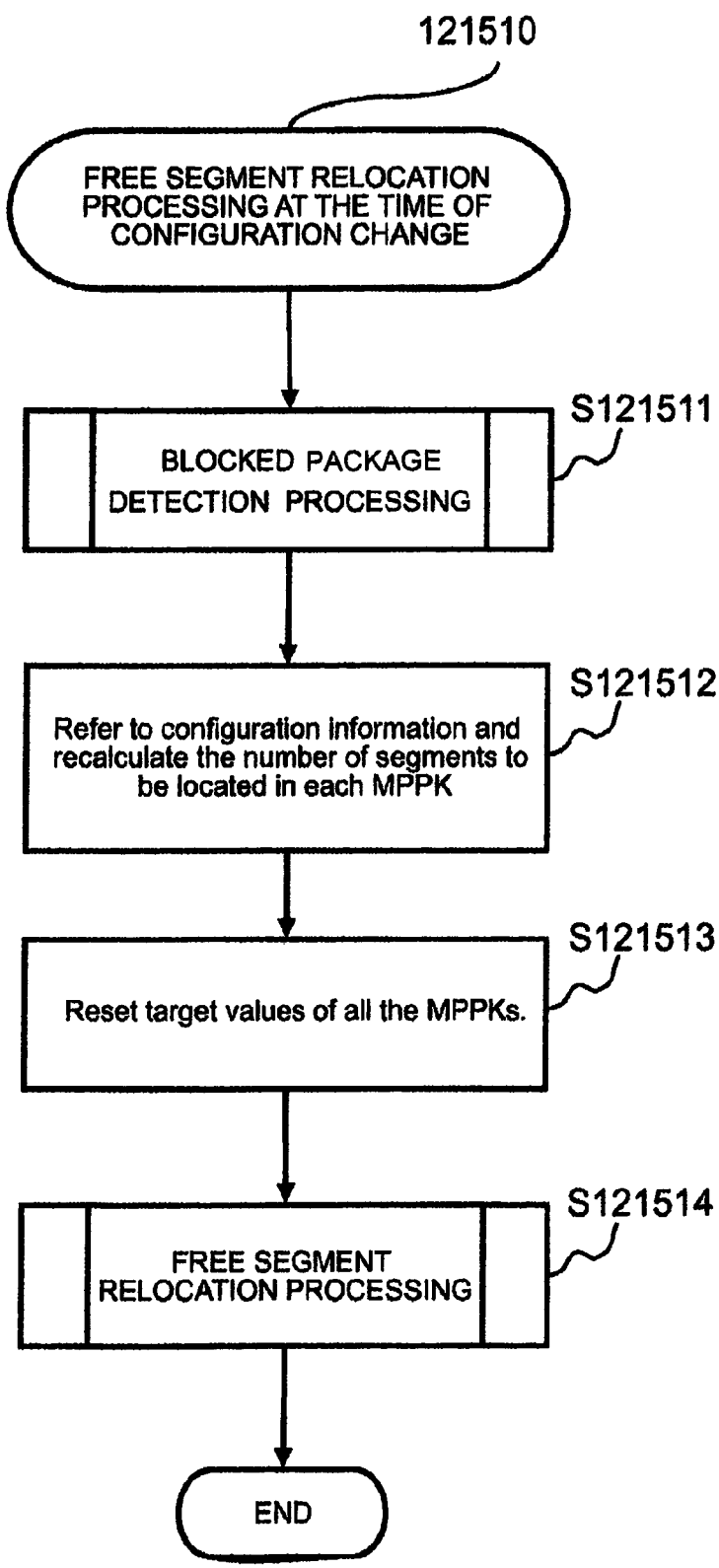
FIG. 15 is a flowchart illustrating target value resetting processing when changing the configuration of the storage subsystem.

FIG. 15 is a flowchart illustrating the target value resetting processing executed when changing the configuration of the storage subsystem.

A change of the configuration is the case where the cache memory for the entire storage system is increased by addition of a CMPK 130000 by the storage administrator.

This processing is invoked when the service processor (SVP) 180000 detects a change of the configuration of the storage system. This processing is executed by the representative MP in the storage system as designated by the service processor (SVP) 180000.

In step 121511, the MP invokes blocked package detection processing 121530 and checks if there is any blocked MPPK. If there is a blocked MPPK, the MP collects the free segments from the blocked MPPK. This blocked package detection processing will be explained later with reference to FIG. 16.

In step 121512, the MP refers to the configuration information 131500 (FIG. 4) and recalculates the number of segments to be located in each MPPK. Specifically speaking, for example, the MP locates as many segments as the number obtained by dividing the total number of segments in the storage system 100000 evenly by the total number of MPPKs which are not blocked, in each MPPK in the same manner as in the control information initialization processing 121100 (FIG. 11).

In step 121513, the MP refers to the located free segment quantity management information 122400 (FIG. 8) in the LMs in all the MPPKs and sets the number of segments obtained in step 121512 as the target value.

In step 121514, the MP invokes the free segment relocation processing 121200 (FIG. 3) and relocates the free segments.

Figure 16:
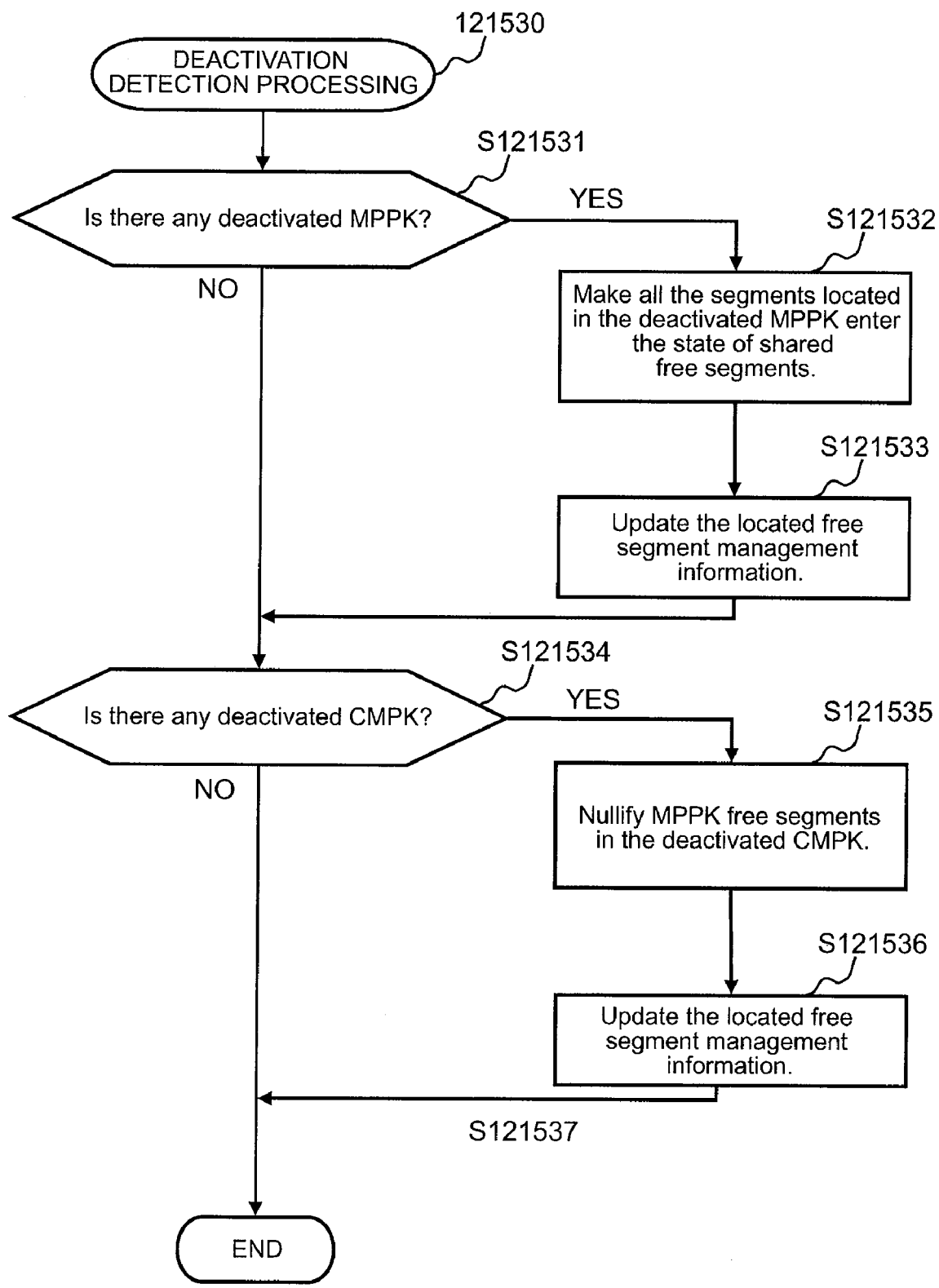
FIG. 16 is a flowchart illustrating processing for detecting a blocked controller.

FIG. 16 is a flowchart illustrating the blocked package detection processing. This processing is executed by one representative MP in the storage system as designated by the service processor (SVP) 180000.

In step 121531, the MP judges whether there is any blocked MPPK or not. If there is no blocked MPPK, the MP proceeds to step 121534. If there is a blocked MPPK, the MP proceeds to step 121532.

In step 121532, the MP frees all the segments located in the blocked MPPK. Dirty segments are first turned into clean segments, which are then freed.

The MP refers to the SMSGCBs (FIG. 6) sequentially to search for an SGCB locked by the blocked MPPK. If there is any SGCB locked by the blocked MPPK, the MP refers to the shared free segment management information 131400 (FIG. 9B) and changes the shared free bit of the segment number corresponding to the SGCB to "1." Then, the MP destroys the lock word for that SGCB. The MP searches all the SMSGCBs in the same manner.

In step 121533, the MP refers to the located free segment quantity management information 122400 (FIG. 8) about the blocked MPPK and changes the number of located segments to "0."

In step 121534, the MP judges whether there is any blocked CMPK or not. If there is a blocked CMPPK, the MP proceeds to step 121535.

In step 121535, the MP sends an instruction to each MPPK to nullify segments in the blocked CMPK from among the SGCBs localized by each MPPK. Specifically speaking, the MP refers to the segment address in the LMSGCB and checks if it is a segment in the blocked CMPK. If there is a segment in the blocked CMPK, the MP destroys the LMSGCB corresponding to that segment.

In step 121536, the MP refers to the located free segment quantity management information 122400 and decreases the number of located segments by the number of segments destroyed in step 121535.

Figure 17:
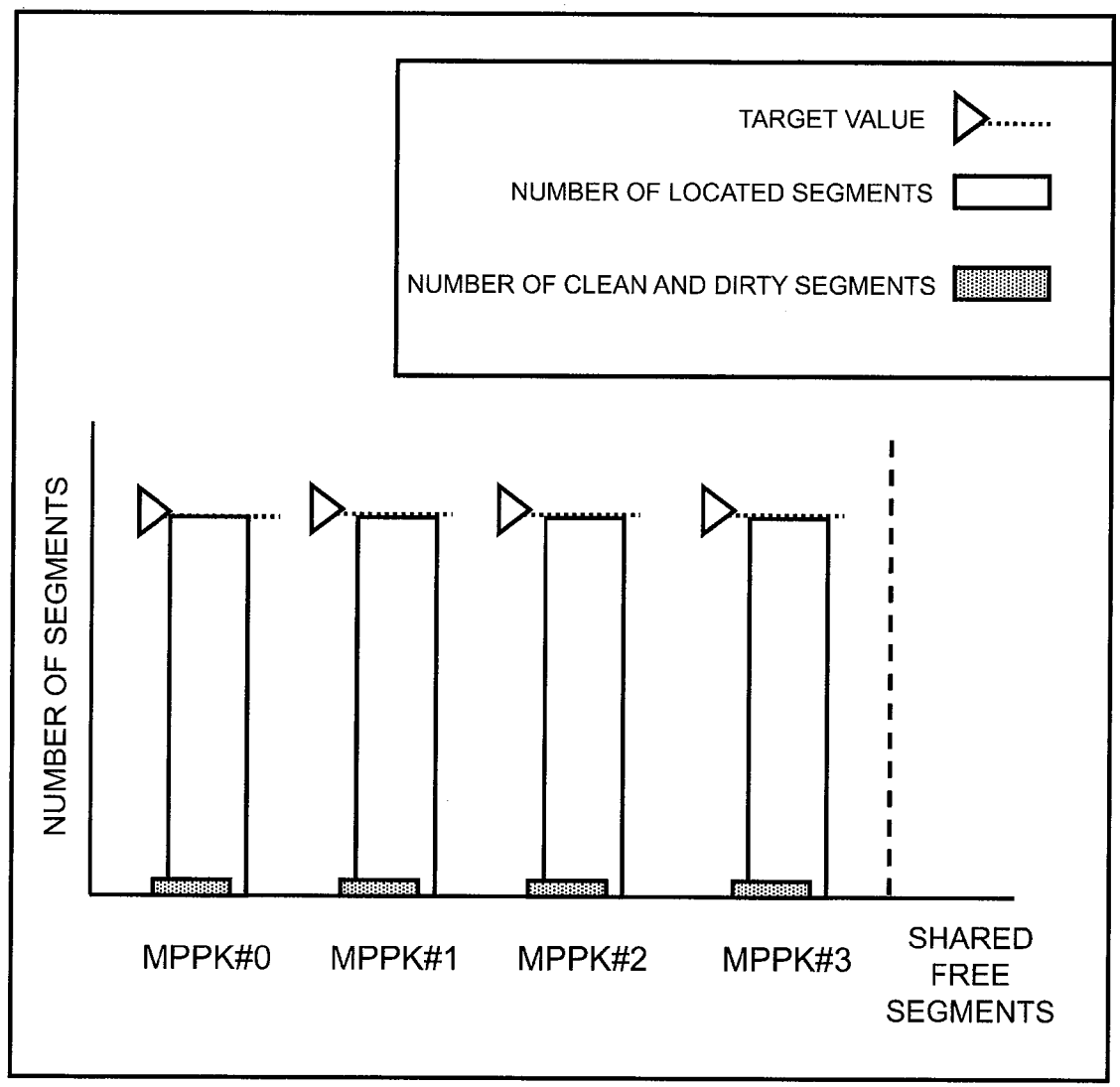
FIG. 17 is a block diagram showing a screen for checking the segment placement status.

FIG. 17 shows a screen for checking the segment placement status. The representative MP obtains necessary information from each MPPK and records it in the SM (FIG. 2). After obtaining this information, the SVP 180000 forms screen information and outputs it as a management screen to a display terminal device. The management screen provides the administrative user with the target value, the number of located segments, and the number of clean and dirty segments for each MPPK.

Incidentally, FIG. 17 shows the management screen immediately after the completion of the initialization processing and the attribute of all the located segments is "free." In other words, the number of clean and dirty segments is a minimum.

Next, another embodiment of the present invention will be explained. In the above-described embodiment, the number of free segments located in each MPPK is set when initializing the target value or changing the configuration. The embodiment described below is characterized in that the usage state of the cache memory is monitored for each of the plurality of MPPKs and the target value is automatically set so that the cache use efficiency of the entire storage system can be maximized.

The I/O load on each MPPK can be realized by transferring the LDEV ownership appropriately as described earlier. However, even if the I/O load is the same, how the cache is used differs depending on access patterns. Therefore, even if the same cache size is prepared for the same I/O load, the cache hit rate will not be constant. For example, if the I/O pattern is sequential access to continuous data, an address to be accessed next is predictable. So, even if the cache size is small, it is possible to increase the cache hit rate efficiently. On the other hand, in a case of random access to a wide range of access target data, the larger the cache size is, the higher the hit rate becomes. Accordingly, it is necessary to adjust the number of segments placed in each MPPK depending on access patterns in order to maximize the cache use efficiency.

Figure 18:
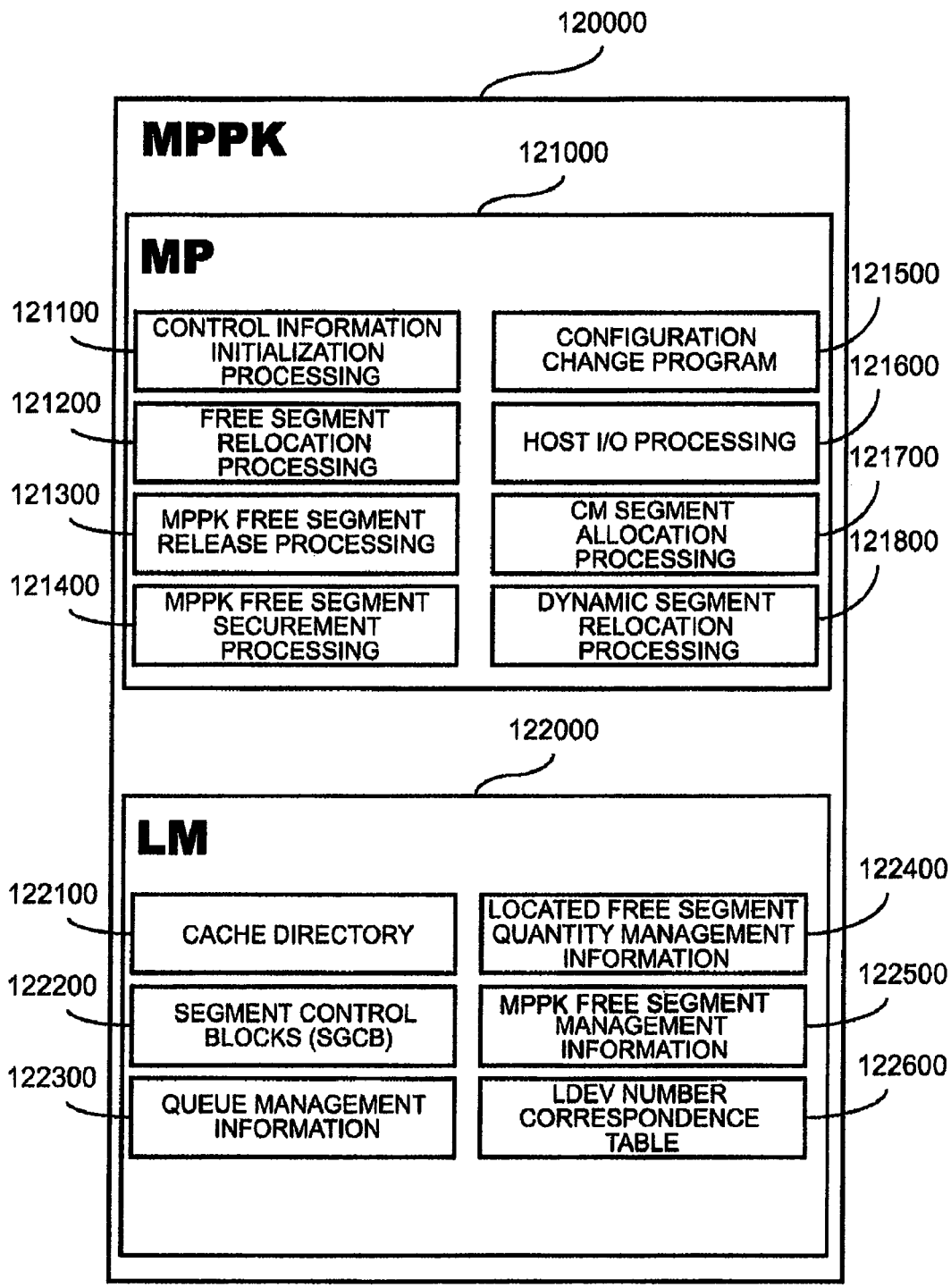
FIG. 18 shows an example of the logical configuration of a controller according to the second embodiment of the invention.

FIG. 18 is a block diagram showing an example of the logical configuration of a control unit (MPPK) according to this embodiment. The same reference numerals as used in FIG. 3 are given to the same components as those in FIG. 3 and a description thereof has been omitted. Only the differences between FIG. 3 and FIG. 18 will be explained below.

Host I/O processing 121600 is to process a host command received by the host I/F 150000 from the host computer 200000. The types of the host command to be received are a "read" command and a "write" command, which will be explained later with reference to FIG. 19 and FIG. 20, respectively. Also, CM segment allocation processing 121700 will be explained later with reference to FIG. 21.

Dynamic segment relocation processing 121800 is processing for automatically setting a target value for each MPPK so that the cache use efficiency of the entire storage system can be maximized. There are a plurality of realization methods depending on indexes for maximization as the method for determining the target value. This will be explained later with reference to FIGS. 22 and 23.

Figure 19:
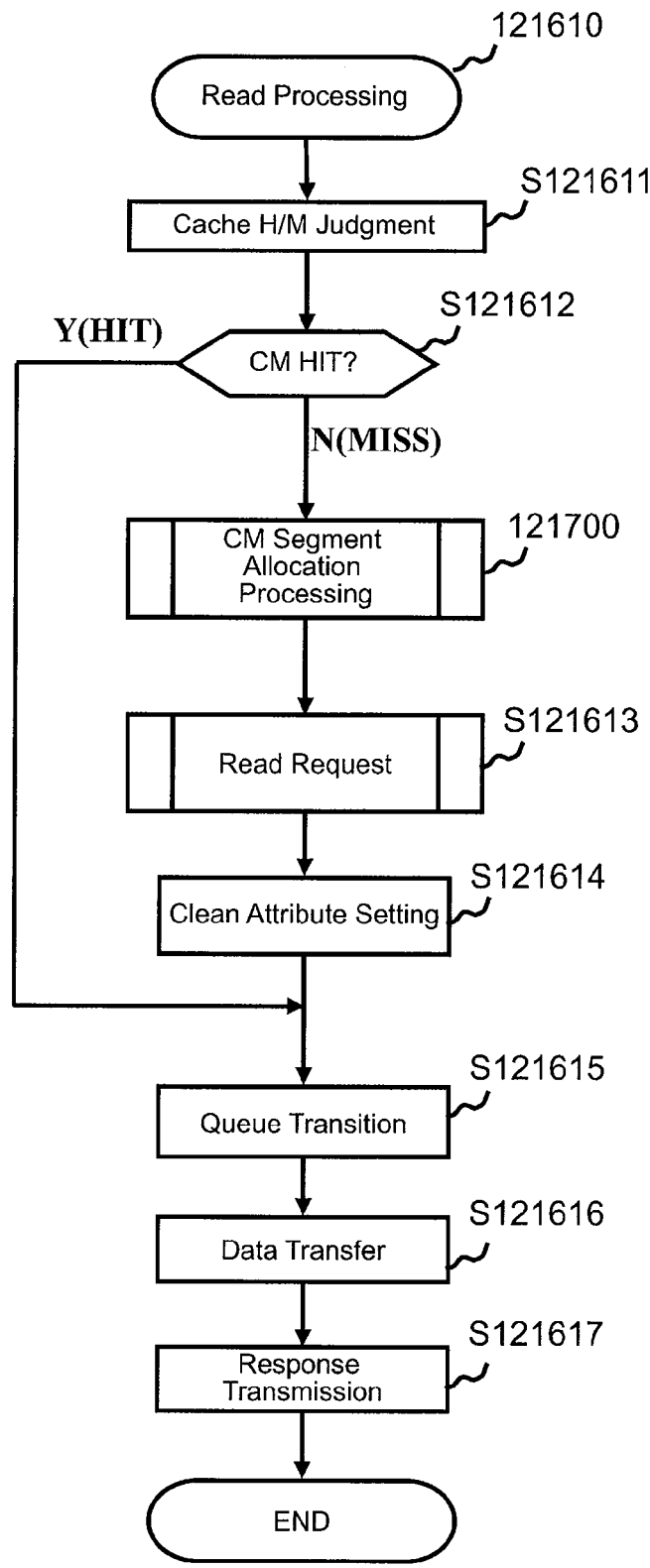
FIG. 19 is a flowchart illustrating an example of read processing executed by the storage subsystem when a read command is issued by the host computer.

FIG. 19 shows an example of processing executed when a read command is issued from the host computer 200000 to the storage subsystem 110000.

In steps 121611 and 121612, the MP performs cache hit/miss judgment. Specifically speaking, for example, the MP refers to the cache directory stored in the LM for its own MPPK and checks if there is any SGCB corresponding to the slot number. If there is a corresponding SGCB, the MP proceeds to step 121615. If there is no corresponding SGCB, the MP executes CM free segment allocation processing 121700, thereby allocating a CM segment to the slot number. This processing will be explained later with reference to FIG. 21.

In step 121613, the MP transfers data from a data area in the storage device 171000 specified by the slot number to a CM segment allocated by the processing 121700.

In step 121614, the MP executes clean attribute setting. Specifically speaking, the MP sets the slot attribute managed in the SGCB to "clean."

In step 121615, the MP performs queue transition (FIG. 6). Specifically speaking, the MP links the SGCB 122200 to the MRU pointer 122310B for the CM clean queue and updates the queue transition time managed in the SGCB to time when this step is executed. In this way, the MP updates the queue transition every time it accesses data in the CM segment in response to a read command.

In step 121616, the MP identifies a CM segment, which stores data requested by the read command transmission source, according to the segment address recorded in the SGCB. Subsequently, the MP transfers data from the identified CM segment to the host computer which is the read command transmission source.

In step 121617, the MP sends a response (for example, read completion) to the host computer.

Figure 20:
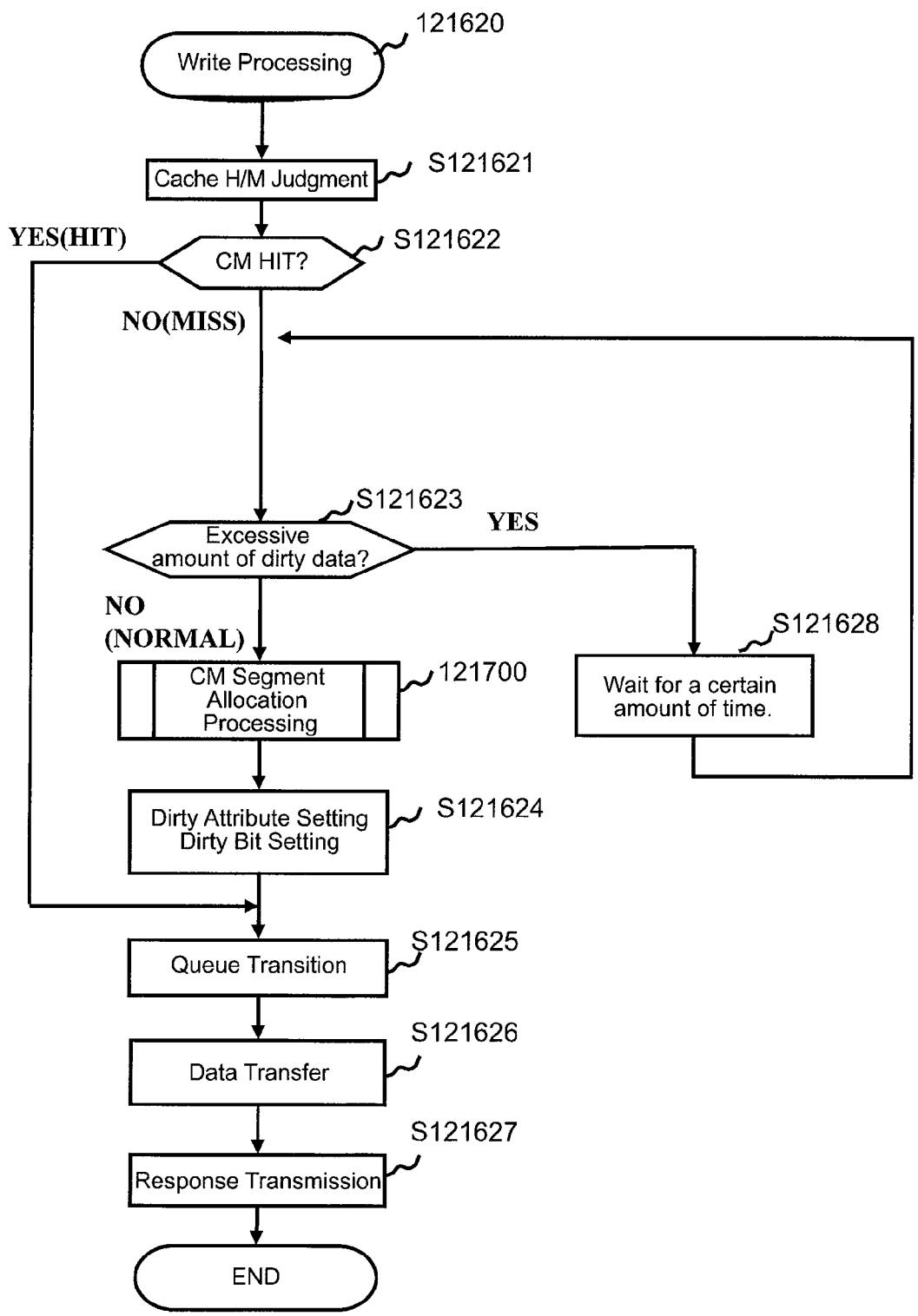
FIG. 20 is a flowchart illustrating an example of write processing executed by the storage subsystem when a write command is issued by the host computer.

FIG. 20 is a flowchart illustrating an example of processing executed by the MP 121000 when a write command is issued form the host computer.

In steps 121621 and 121622, the MP performs cache hit/miss judgment like in steps 121611 and 121612. In the case of a cache hit, the MP proceeds to step 121625. In the case of a cache miss, the MP proceeds to step 121623.

If the MP detects in step 121623 that there is an excessive amount of dirty data, for example, the amount of SGCBs whose slot attribute is "dirty" reaching a specified value, the MP proceeds to step 121628 and waits for a certain amount of time until the attribute of the dirty segments is changed to clean. If the MP does not detect an excessive amount of dirty data, it executes the CM segment allocation processing 121700. This processing will be explained later with reference to FIG. 21.

In step 121624, the MP sets the dirty attribute and the dirty bit. The MP performs the dirty attribute setting and the dirty bit setting specifically by, for example, setting the slot attribute "dirty" to an SGCB corresponding to a CM segment to which the relevant data is to be transferred, and setting the bit corresponding to that CM segment to be valid in the dirty bit map for the SGCB. Incidentally, the slot attribute is set to "dirty" at this stage because the data written to the CM segment has not been written to the storage devices yet.

In step 121625, the MP performs queue transition. The queue transition is performed in the same manner as in step 121614. Specifically speaking, the MP links the SGCB 122200 to the MRU pointer 122320B for the dirty queue and updates the queue transition time managed in the SGCB to time when this step is executed.

In step 121626, the MP transfers the relevant data according to the write command from the host computer, to the CM segment allocated by the CM segment allocation processing 121700. In other words, the data is written to the CM segment.

In step 121627, the MP sends a response (for example, write completion).

Separately from FIG. 20, the MP also executes processing for calculating parity for the data written to the CM segment, writing the parity to the storage devices 171000, and creating a free space in the CM segment. When executing this processing, the MP sequentially dequeues SGCBs from the dirty queue LRU side, writes data in the CM segment to the storage devices 171000, and enqueues the SGCBs to the clean queues. When this happens, the MP dequeues the SGCBs from the dirty queues and updates the dirty LRU time.

Figure 21:
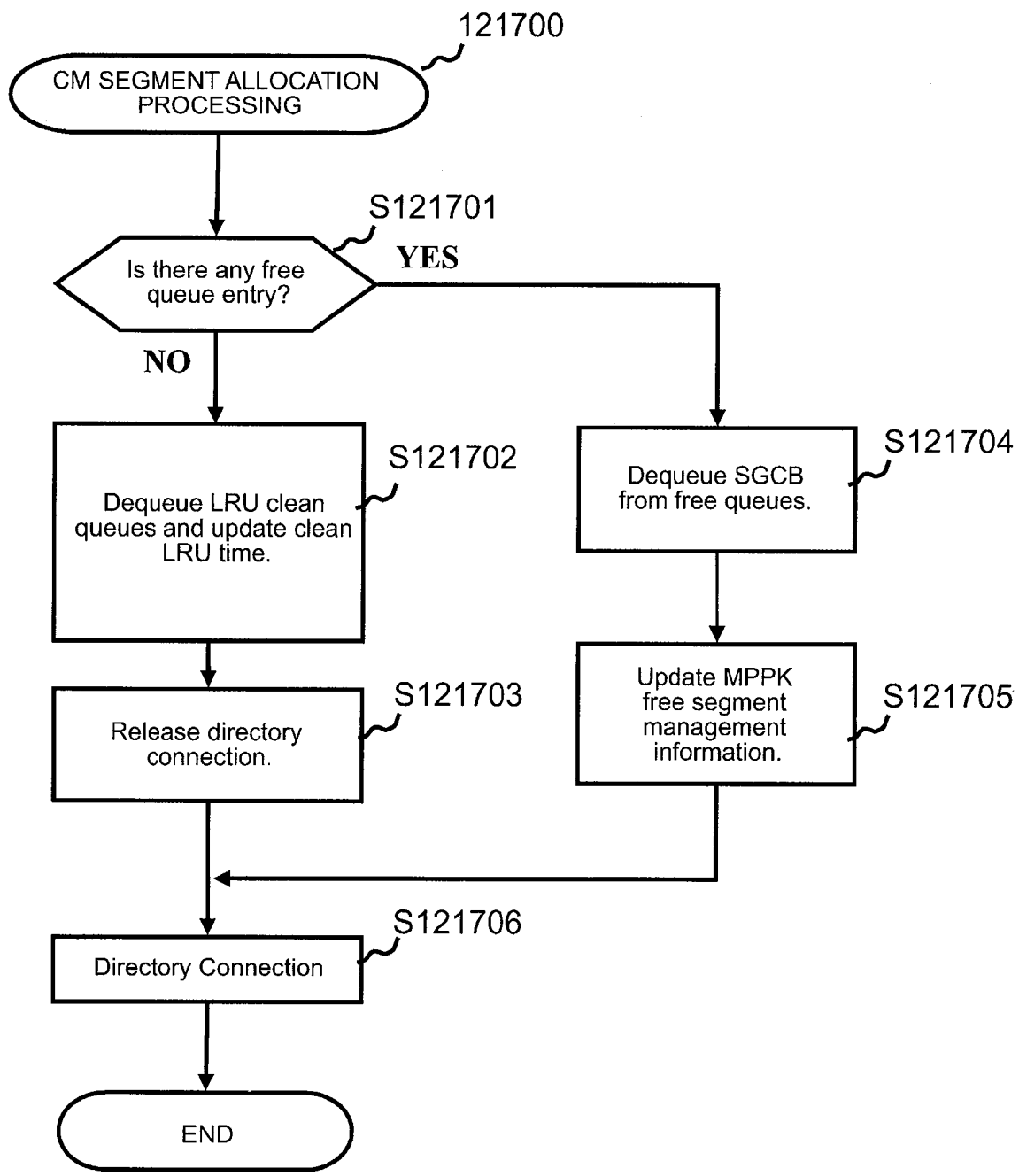
FIG. 21 is a flowchart illustrating an example of processing executed by the storage subsystem for allocating cache segments in response to an access command from the host computer.

FIG. 21 is a flowchart illustrating an example of a flow of free segment allocation processing. This processing is executed by the representative MP of each of the plurality of MPPKs. In step 121701, the MP judges whether or not there is any SGCB in the free queue (FIG. 7C). If there is an SGCB, the MP proceeds to step 121701; and if there is no SGCB, the MP proceeds to step 121702.

In step 121704, the MP removes the SGCB from the free queue; in other words, the MP dequeues the SGCB linked to the free queue pointer. The MP then proceeds to step 121705.

In step 121705, the MP sets the MPPK free bit (FIG. 9A) corresponding to the segment number of the SGCB dequeued in step 121704 to "1."

In step 121702, the MP dequeues an SGCB linked to the clean queue LRU pointer 122310A from the clean queue and updates the clean LRU time. For example, the MP can evaluate the use efficiency of the cache for each MPPK by using this clean LRU time.

In other words, a short clean LRU time means that a read request is frequently made by the host, that is, the cache use of the cache segents is high. On the other hand, a long clean LRU time means that use efficiency of the cache segments is low. In this way, the cache use efficiency for each MPPK can be evaluated by using the clean LRU time.

If the host computer frequently issues read commands, data in the CM segments is frequently replaced, so that the clean LRU time becomes short. On the other hand, if the number of command requests made by the host computer is small, the CM segments are continuously connected to the queues, so that the clean LRU time becomes long.

In step 121703, the MP releases directory connection. Specifically speaking, the MP releases association between the LM cache directory 122100 and the dequeued SGCBs 122200.

In step 121706, the MP performs directory connection. Specifically speaking, the MP associates the LM cache directory 122100 with its SGCB 122200 by storing the slot number indicating where to store the relevant data and its hash value (SGCB pointer) in the SGCB.

Figure 22:
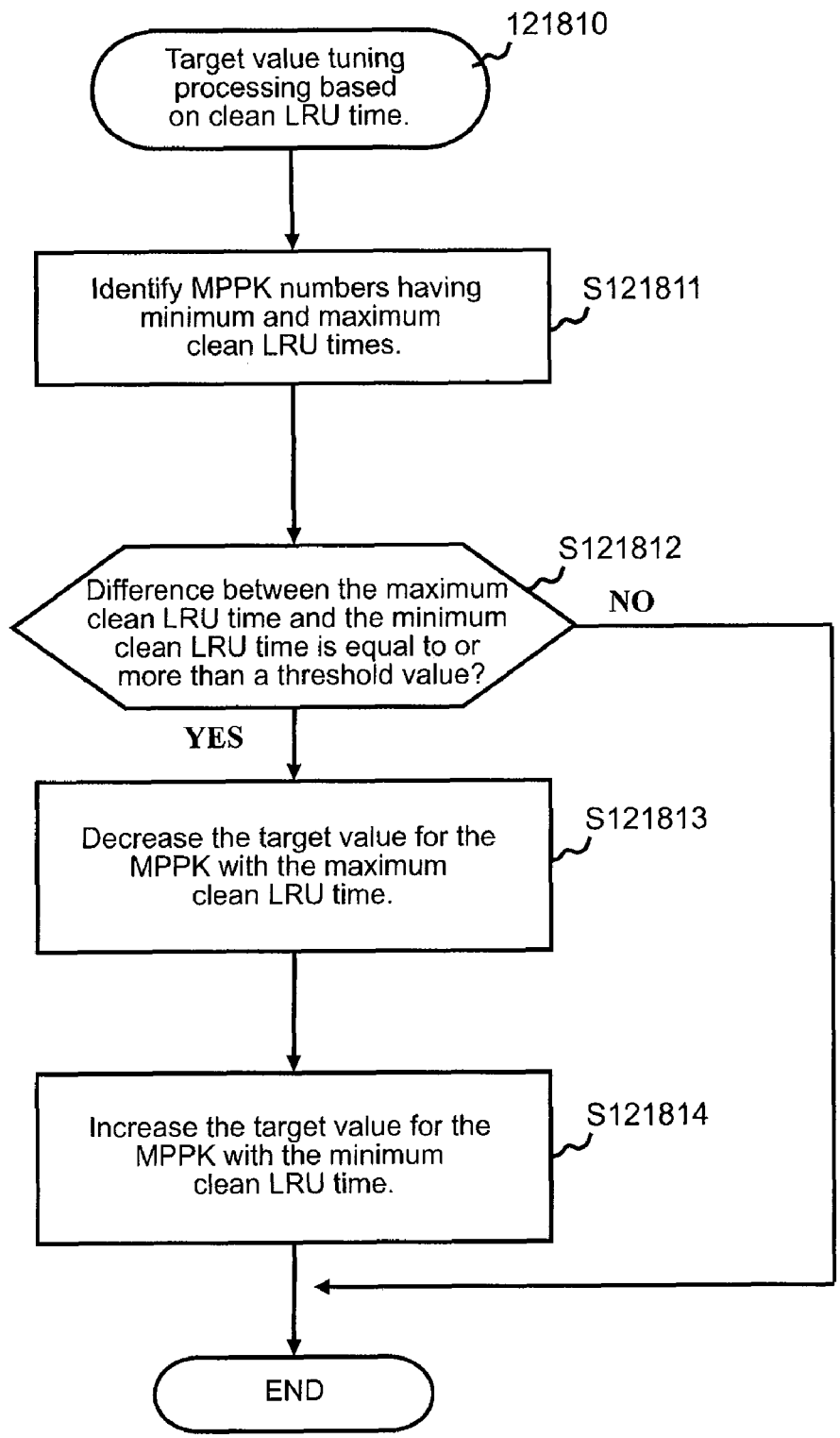
FIG. 22 is a flowchart illustrating an example of processing for tuning the number of segments to be located in each controller based on queue transition.

FIG. 22 is a flowchart illustrating an example of processing executed by the MP for automatically tuning the number of segments located in each MPPK based on the clean LRU time. As described earlier, the queue transition time in the SGCB 122200 linked to the LRU pointer 122310 for the clean queue will be referred to as "clean queue LRU time (clean LRU time)."

This flowchart particularly illustrates processing for allocating segments from an MPPK with long clean LRU time to an MPPK with short clean LRU time. If the clean LRU time is short, it can be presumed that a read request is frequently issued from the host computer. Therefore, it can be expected that preferential allocation of free cache segments to the MPPK will result in enhancement of a cache hit rate of the MPPK.

On the other hand, if the clean LRU time is long, it is presumed that the use efficiency of cache segments is low. Therefore, even if parts of the located CM segments are released from the MPPK, it can be expected that the cache use efficiency will not decrease significantly.

The processing shown in FIG. 22 is executed by one representative MP in the storage subsystem. In step 121811, the MP identifies the MPPK number with the minimum clean LRU time and the MPPK number with the maximum clean LRU time from among all the MPPKs.

In step 121812, the MP checks if the difference between the maximum clean LRU time and the minimum clean LRU time as identified in step 121811 is equal to or more than a threshold value. Assuming that this threshold value is, for example, 30% of the maximum queue transition time, if the difference is less than the threshold value, the processing terminates in this flowchart. If the difference is equal to or more than the threshold value, the MP proceeds to step 121813.

In step 121813, the MP decreases the target value relating to placement of free segments in the MPPK with the maximum clean LRU time by a fixed amount, for example, only 1% of the total number of segments in the storage system.

In step 121814, the MP increases the target value for the MPPK with the minimum clean LRU time by a fixed amount equal to or less than, for example, the number of segments decreased in step 121813.

The MP preferentially locates the CM segments to the MPPK which can be expected to have a high read hit rate, that is, high cache use efficiency, by tuning the target value.

Figure 23:
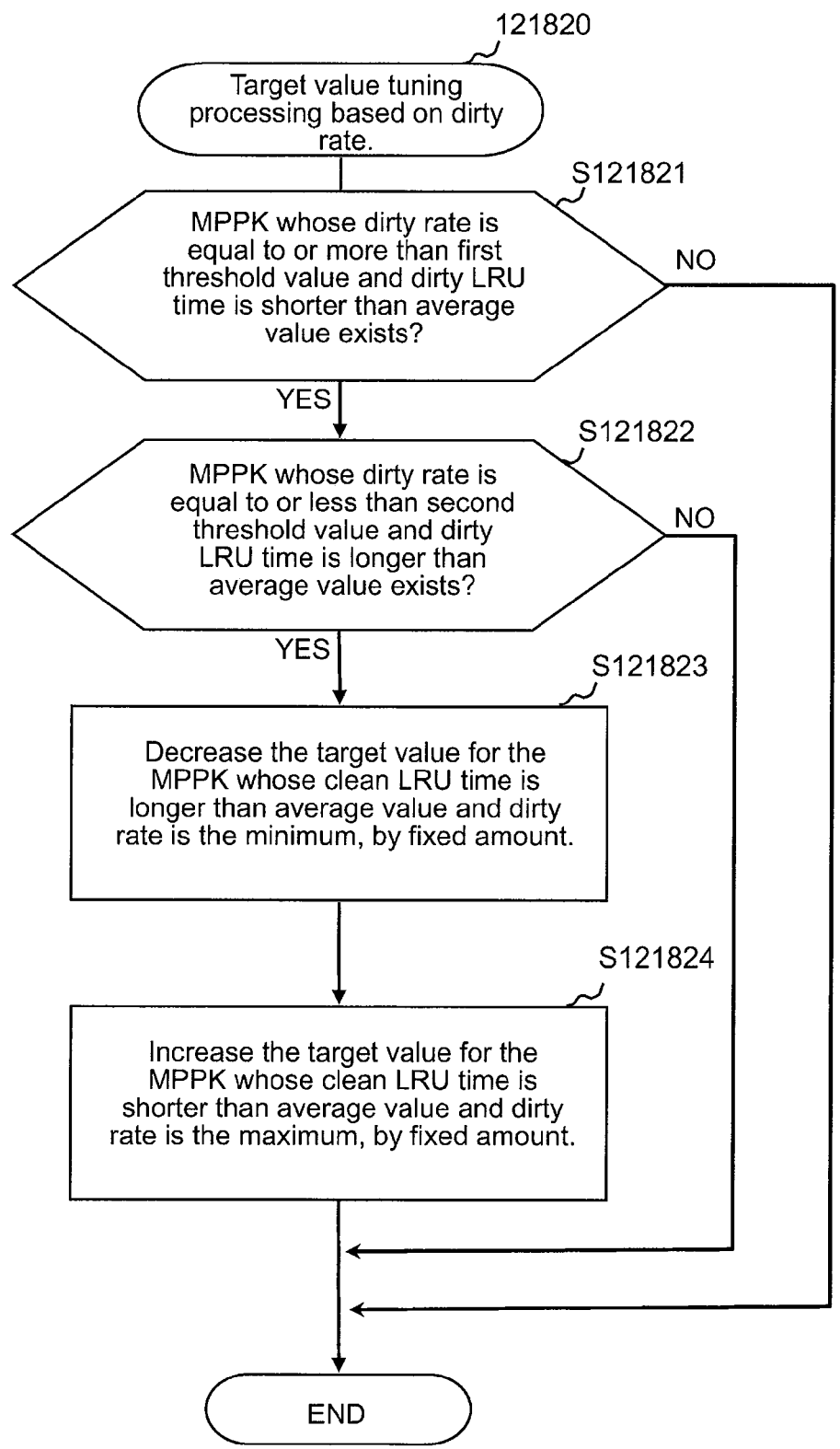
FIG. 23 is a flowchart illustrating an example of processing for tuning the number of segments to be located in each controller based on a dirty rate.

FIG. 23 is a flowchart illustrating an example of processing for automatically tuning the number of segments located in each MPPK based on a dirty rate. The dirty rate means a rate of the number of SGCBs whose attribute is "dirty" with respect to the total number of segments already located in each MPPK. In other words, the dirty rate is management information about data in the state not written to the storage devices.

This processing is executed by one representative MP in the storage system. In step 121821, the MP calculates the dirty rates of all the MPPKs and then checks if any MPPK whose dirty rate is equal to or more than a first threshold value (specifically, for example, 70%) and whose dirty LRU time is shorter than an average value exists.

If such an MPPK does not exist, the MP terminates this processing. If such an MPPK exists, the processing proceeds to step 121822. The MP excludes MPPK(s) whose dirty LRU time is longer than the average value, from the segment securement target(s). As a result, consumption of cache segments by the MPPK(s) which has accumulated dirty data because of low throughput of discharging the dirty data to the storage devices and operates the cache with low use efficiency is prevented.

In step 121822, the MP checks if any MPPK whose dirty rate is equal to or less than a second threshold value, for example, 30% and whose clean LRU time is longer than the average value exists or not. If such an MPPK does not exist, the processing terminates in this flowchart. If such an MPPK exists, the MP proceeds to step 121823. The MP excludes the MPPK(s) with the clean LRU time shorter than the average value from the segment release target(s) in order to prevent reduction of the number of free segments located in the MPPK(s) that can be expected to have high cache use efficiency.

In step 121823, the MP decreases the target value for the MPPK with the minimum dirty rate by a fixed amount, for example, only 1% of the total number of segments in the storage system. In step 121824, the MP increases the target value for the MPPK with the maximum dirty rate by a fixed amount equal to or less than, for example, the number of segments decreased in step 121813.

In this way, the MP preferentially locates CM segments to an MPPK which has accumulated dirty data because of, for example, a large amount of write data inflow, and thereby prevents degradation of write response performance of the MPPK due to deficiency of CM segments.

Figure 24:
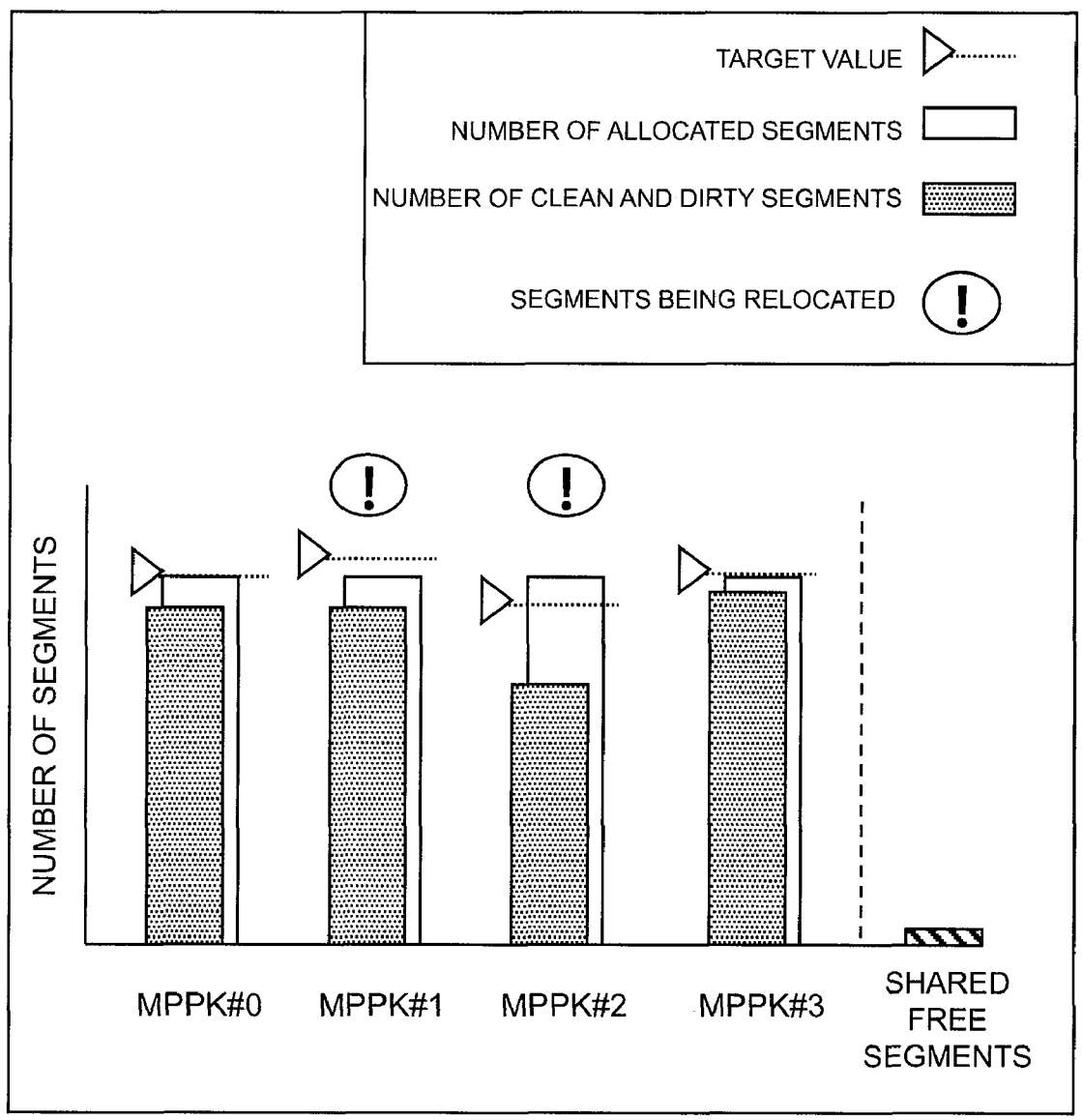
FIG. 24 is a block diagram showing a screen for displaying the process of automatically adjusting a target value of free segments for each controller.

FIG. 24 shows a management screen for displaying the process of automatic adjustment of target values for the MPPKs. The management screen provides the administrative user with the target value, the number of located segments, and the number of clean and dirty segments for each MPPK in the same manner as in FIG. 17.

FIG. 24 shows a screen immediately after the target value for each MPPK is changed by applying performance tuning to each MPPK. Therefore, not all the target values for the MPPKs are identical to each other. Incidentally, the management check screen may include some indicator so that the administrative user can manage the segments which are being relocated.

Figure 25:
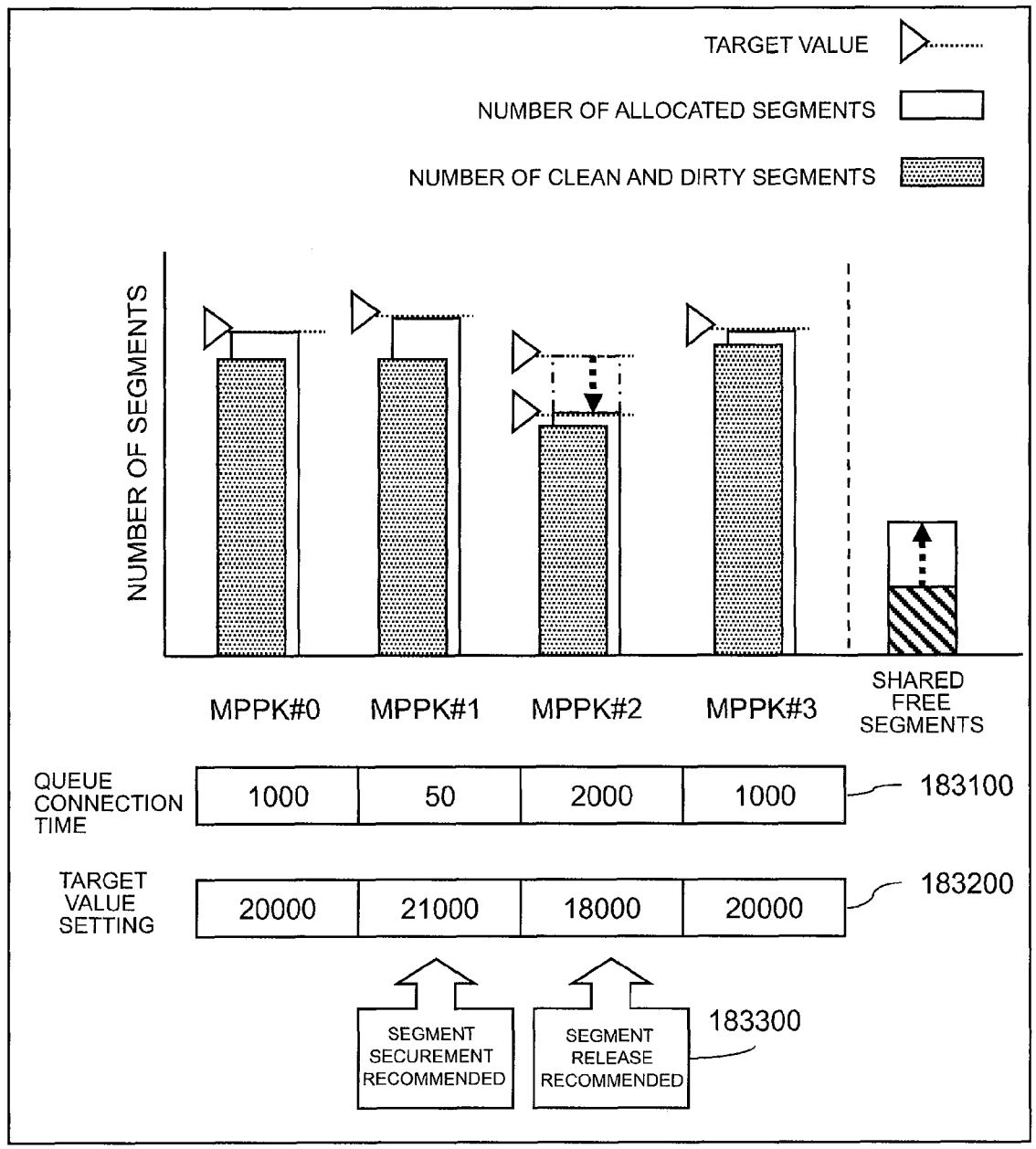
FIG. 25 is a block diagram for explaining an operation screen for manually tuning a target value of free segments for each controller.

FIG. 25 is a screen for tuning free segments to be located in each MPPK by manually setting the target values for the MPPKs. This management screen is checked by the system administrator by means of the service processor (SVP) 180000. The management screen allows the user to confirm the target value, the number of located segments, and the number of clean and dirty segments for each MPPK in the same manner as in FIG. 17.

FIG. 25 further displays queue transition time 183100 and the setting content of the target value of free segments to be located in the relevant MPPK 183200 for each MPPK. Furthermore, the management screen in FIG. 25 also includes an indicator indicating that securement of free segments is recommended for the relevant MPPK, and an indicator 183300 indicating that release of free segments is recommended for the relevant MPPK.

FIGS. 22 and 23 show the processing for automatically tuning the target value in order to maximize the cache use efficiency. However, the administrator of the system may directly manually perform tuning of the target value. The means of changing the target value by the administrator is realized by, for example, inputting the target value to the target value setting field (FIG. 25) using an input device such as a keyboard mounted on the service processor (SVP) 180000.

As described earlier, the storage subsystem allocates free segments between a plurality of MPPKs, not by directly delivering or receiving the free segments between the plurality of MPPKs, but by setting a set of free segments in the shared free state as shown in FIG. 9B and then allocating the free segments from the shared free segment group to the MPPKs.

Figure 28A:
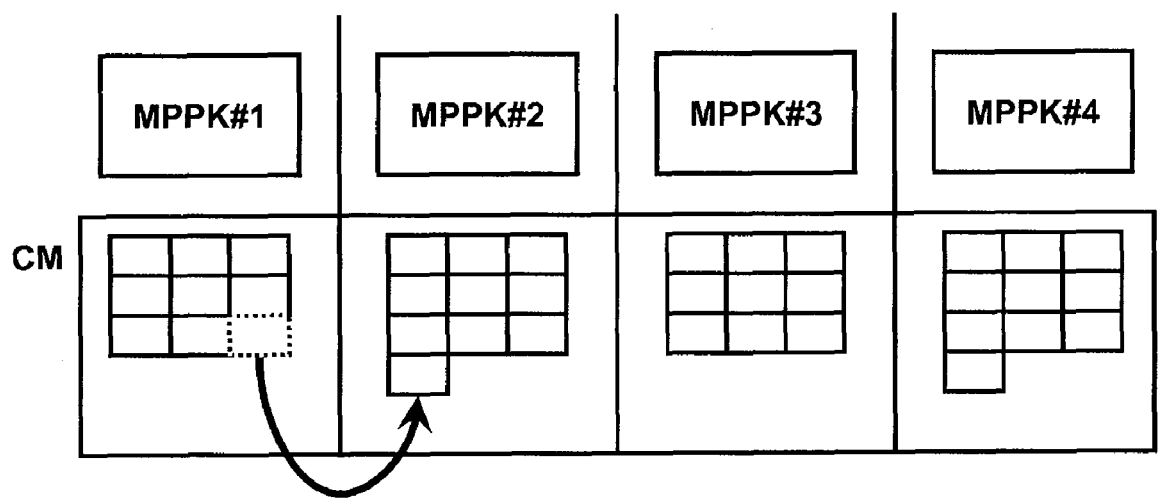
FIG. 28A is a block diagram for explaining the outline of actions for migrating free segments between a plurality of controllers.
Figure 28B:
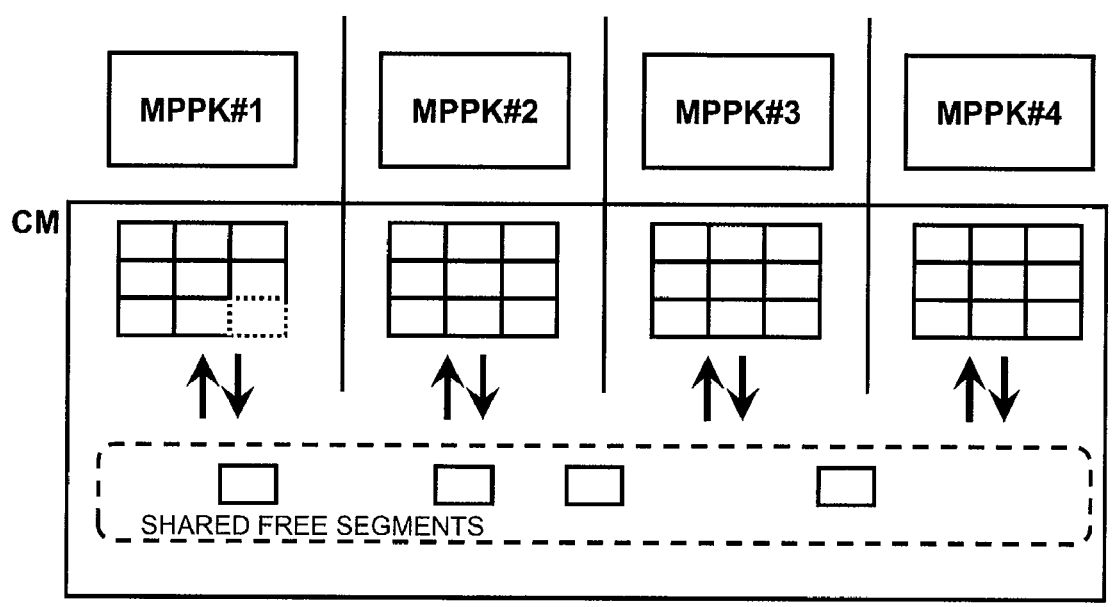
FIG. 28B is a block diagram for explaining the outline of actions for migrating free segments between a plurality of controllers through the intermediary of the shared state.

The reason for this process will be explained with reference to FIG. 28. FIG. 28A is a block diagram showing allocation of free segments between the plurality of MPPKs. If the storage system tries to directly move a free segment in the cache from MPPK #1 to MPPK #2 as indicated with an arrow, it is necessary to synchronize the completion of the free segment securement processing by MPPK #2 with the completion of the free segment release processing by MPPK #1. As a result, unnecessary wait time occurs in moving the free segments.

On the other hand, if (FIG. 28B) the storage system sets a group of shared free segments by using the free segments released from the MPPKs and then allocating the free segments from this group of shared free segments to the MPPKs, delivery/reception of the free segments to/from each MPPK can be performed asynchronously. Therefore, unnecessary wait time will not occur in moving the free segments and it is possible to prevent reduction of the operating ratio of the MP.

Incidentally, the "computer system" in this specification means a storage control apparatus equipped with a host computer on a user's side and a storage system and also means a storage subsystem or a storage system constituted from a storage subsystem and storage devices.

REFERENCE SIGNS LIST

100000 Storage system
110000 Controller
120000 Control unit (MPPK)
121000 MP
122000 LM
130000 Shared memory unit (CMPK)
140000 Internal network
150000 Host interface (I/F)
160000 Disk interface (I/F)
170000 Disk array apparatus (storage apparatus)
180000 Service processor (SVP)
200000 Host computer
300000 External network

The invention claimed is:

1. A computer system for controlling a data input/output request from a host computer to a storage device, the computer system comprising:
a control unit having a plurality of controllers, each of which has a local memory and has processing authority to share processing on the input/output request;
a shared memory for recording control information shared by the plurality of controllers when processing the input/output request;
a first interface to which the host computer is connected; and
a second interface to which the storage device is connected;
wherein each of the plurality of local memories records a relevant piece of control information, from among the control information, that is assigned to a respective one of the plurality of controllers corresponding to that local memory;
the respective one of the plurality of controllers fulfills a control function with respect to the input/output request based on the assigned control information; and
the control unit releases the control function from the respective one of the plurality of controllers and allocates the released control function to another one of the controllers; and
wherein the control unit divides a storage area of the storage device into a plurality of logical areas, and provides them to the host computer;
wherein the shared memory has the control information including a logical area management table to have the plurality of controllers share and manage processing of the input/output request with respect to the plurality of logical areas;

wherein the control unit copies management information, from among the logical area management table, relating to the plurality of logical areas allocated to the respective one of the plurality of controllers corresponding to the local memory, from the shared memory to the local memory for each corresponding local memory of the plurality of controllers;

wherein the computer system further comprises a cache memory having a plurality of segments for storing the data when the control unit performs processing of the data input/output;

wherein the control unit allocates the plurality of segments as the storage control function to the plurality of controllers based on the control information, and releases one or more of the plurality of segments, which have an attribute capable of writing the data, from a respective one of the controllers to which the one or more of the plurality of segments are allocated, in order to make them enter a shared state so that the one or more of the plurality of segments can be allocated to the plurality of controllers; and the control unit then allocates the one or more of the plurality of segments in the shared state to another one of the plurality of controllers;

wherein the shared memory includes: a first correspondence relationship table showing a correspondence relationship between the plurality of segments and the plurality of logical areas, a second correspondence relationship table for managing the shared state of the plurality of segments, and a third correspondence relationship table for managing allocation of the plurality of segments to the plurality of controllers;

wherein each of the plurality of local memories records information, from among the first correspondence relationship table, which is assigned to a respective one of the plurality of controllers corresponding to that local memory;

wherein the respective one of the plurality of controllers judges the respective one of the plurality of segments corresponding to the logical area, which is a target of the input/output request, based on information in the second correspondence relationship table; accesses the respective one of the plurality of segments; releases allocation of the respective one of the plurality of segments, which has an attribute capable of writing the data, from the third correspondence relationship table in order to make it enter the shared state so that the respective one of the plurality of segments can be allocated to another one of the plurality of controllers; and further registers allocation of the respective one of the plurality of segments in the second correspondence relationship table; and wherein the control unit sets a target value of the plurality of segments to be allocated to each of the plurality of controllers to the respective local memory of each of the plurality of controllers, sets a number of allocated segments, and compares the target value with the number of allocated segments;

wherein, if it is determined that the target value is larger than the number of allocated segments, the control unit releases the respective ones of the plurality of segments in the shared state from the second correspondence relationship table and registers them in the third correspondence relationship table; and wherein, if it is determined that the target value is smaller than the number of allocated segments, the control unit releases the respective ones of the plurality of segments from the third correspondence relationship table and registers them in the second correspondence relationship table.

2. The computer system according to claim 1, wherein the control unit logicalizes a storage area in the storage device, divides the logicalized storage area into a plurality of logical areas, and provides them to the host computer;
    wherein the shared memory has the control information including a logical area management table to have the plurality of controllers share and manage processing of the input/output request with respect to the plurality of logical areas; and
    wherein the control unit copies management information, from among the logical area management table, relating to the plurality of logical areas allocated to the controller corresponding to the local memory, from the shared memory to each local memory.

3. The computer system according to claim 2, further comprising a cache memory having a plurality of segment areas for storing the data when the control unit performs processing of the data input/output;
    wherein the control unit allocates the plurality of segments as the storage control function to the plurality of controllers based on the control information.

4. The computer system according to claim 3, wherein the control unit releases the segments, which have an attribute capable of writing the data, from the controller to which the segments are allocated, in order to make them enter the shared state so that the segments can be allocated to the plurality of controllers; and the control unit then allocates the segments in the shared state to another controller.

5. The computer system according to claim 1,
    wherein if it is determined that there is a difference between the target value and the number of allocated segments, the control unit reallocates the plurality of segments between the plurality of controllers so that the number of allocated segments of each of the plurality of controllers becomes equal to the target value.

6. The computer system according to claim 5, wherein the control unit compares a target value of the segments having an attribute capable of writing the data, with the number of allocated segments; and
    if it is determined that the target value of the segments having an attribute capable of writing the data is larger than the number of allocated segments, the control unit releases the respective ones of the plurality of segments in the shared state from the second correspondence relationship table and registers them in the third correspondence relationship table; and
    if it is determined that the target value of the segments having an attribute capable of writing the data is smaller than the number of allocated segments, the control unit releases the respective ones of the plurality of segments from the third correspondence relationship table and registers them in the second correspondence relationship table.

7. The computer system according to claim 5, wherein the control unit sets, as the target value, a value obtained by dividing the total number of the plurality of segments in the cache memory by the total number of the plurality of controllers, to each of the plurality of controllers.

8. The computer system according to claim 5, wherein the control unit compares LRUs of clean data with respect to the plurality of controllers and then changes the target value for at least one of the plurality of controllers based on the comparison result.

9. The computer system according to claim 8, wherein the control unit identifies one of the plurality of controllers with the LRU which is a minimum, and one of the plurality of controllers with the LRU which is a maximum, and
    decreases the target value for the one of the plurality of controllers with the minimum LRU, and
increases the target value for the one of the plurality of controllers with the maximum LRU.

10. The computer system according to claim 5, wherein the control unit finds a rate of the plurality of segments whose data is dirty data, with respect to each of the plurality of controllers, compares the rates of the plurality of segments, and changes the target value for at least one of the plurality of controllers based on the comparison result.

11. The computer system according to claim 10, wherein the control unit compares LRUs of clean data with respect to the plurality of controllers and then changes the target value for at least one of the plurality of controllers based on the comparison of the rates of the plurality of segments whose data is dirty data and on the comparison of the LRUs.

* * * * *